United States Patent
Bae et al.

(10) Patent No.: US 12,108,387 B2
(45) Date of Patent: Oct. 1, 2024

(54) METHOD, USER EQUIPMENT, DEVICE, AND STORAGE MEDIUM FOR TRANSMITTING PUSCH, AND METHOD AND BASE STATION FOR RECEIVING PUSCH

(71) Applicant: LG ELECTRONICS INC., Seoul (KR)

(72) Inventors: Duckhyun Bae, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 17/594,442

(22) PCT Filed: May 4, 2020

(86) PCT No.: PCT/KR2020/005870
§ 371 (c)(1),
(2) Date: Oct. 15, 2021

(87) PCT Pub. No.: WO2020/226391
PCT Pub. Date: Nov. 12, 2020

(65) Prior Publication Data
US 2022/0191903 A1    Jun. 16, 2022

(30) Foreign Application Priority Data

May 3, 2019    (KR) .................. 10-2019-0052109
May 10, 2019   (KR) .................. 10-2019-0055189

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/0446* (2013.01); *H04W 72/20* (2023.01)

(58) Field of Classification Search
CPC ....... H04L 1/08; H04L 1/1861; H04L 1/1893; H04L 5/0007; H04L 5/0012;
(Continued)

(56) References Cited

U.S. PATENT DOCUMENTS

| 2019/0116585 | A1 | 4/2019 | Chakraborty et al. |
| 2019/0132882 | A1 | 5/2019 | Li et al. |
| 2021/0176018 | A1* | 6/2021 | Bai ............... H04W 72/535 |
| 2021/0274527 | A1* | 9/2021 | Nakamura ........... H04L 5/0044 |

FOREIGN PATENT DOCUMENTS

| CN | 102137496 | 7/2011 |
| CN | 107439047 | 12/2017 |
| KR | 10-2011-0055367 | 5/2011 |

OTHER PUBLICATIONS

The State Intellectual Property Office of the People's Republic of China Application Serial No. 202080033017.0, Office Action dated Jul. 26, 2023, 7 pages.

(Continued)

*Primary Examiner* — Kashif Siddiqui
(74) *Attorney, Agent, or Firm* — LEE, HONG, DEGERMAN, KANG & WAIMEY

(57) ABSTRACT

A user equipment/base station receives/transmits resource allocation for a PUSCH; determines a plurality of radio resources on the basis of the resource allocation; and repeatedly transmits/receives the PUSCH on the basis of the plurality of radio resources. The repeated transmission/reception of the PUSCH may comprise: applying PUSCH mapping type B to each of the plurality of radio resources; and transmitting a demodulation reference signal (DMRS)
(Continued)

for the PUSCH, on the basis of the plurality of radio resources and the PUSCH mapping type B.

9 Claims, 15 Drawing Sheets

(51) Int. Cl.
*H04W 72/0446* (2023.01)
*H04W 72/20* (2023.01)

(58) Field of Classification Search
CPC ... H04L 5/0044; H04L 5/0048; H04L 5/0051; H04L 5/0055; H04L 5/0094; H04W 72/0446; H04W 72/1268; H04W 72/20; H04W 72/23
See application file for complete search history.

(56) References Cited

OTHER PUBLICATIONS

PCT International Application No. PCT/KR2020/005870, International Search Report dated Aug. 24, 2020, 14 pages.
Spreadtrum Communications, "Discussion on UL Signals and Channels in NR-U," R1-1906356, 3GPP TSG RAN WG1 #97, May 2019, 7 pages.
NTT Docomo, Inc., "Summary of 7.2.6.3 Enhanced configured grant PUSCH transmissions," R1-1901330, 3GPP TSG RAN WG1 Ad-Hoc Meeting 1901, Jan. 2019, 55 pages.
Samsung, "PDCCH blind decoding capabilities for NR DC," R2-1906822, 3GPP TSG-RAN WG2 Meeting #106, May 2019, 10 pages.

* cited by examiner (a)

(b)

METHOD, USER EQUIPMENT, DEVICE, AND STORAGE MEDIUM FOR TRANSMITTING PUSCH, AND METHOD AND BASE STATION FOR RECEIVING PUSCH

CROSS-REFERENCE TO RELATED APPLICATIONS

This application is the National Stage filing under 35 U.S.C. 371 of International Application No. PCT/KR2020/005870, filed on May 4, 2020, which claims the benefit of earlier filing date and right of priority to Korean Application Nos. 10-2019-0052109, filed on May 3, 2019, and 10-2019-0055189, filed on May 10, 2019, the contents of which are all hereby incorporated by reference herein in their entireties.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

In an aspect of the present disclosure, a method of transmitting a physical uplink shared channel (PUSCH) by a user equipment (UE) in a wireless communication system is provided. The method may include: receiving a resource allocation for the PUSCH; determining a plurality of radio resources based on the resource allocation; and repeatedly transmitting the PUSCH based on the plurality of radio resources. Repeatedly transmitting the PUSCH may include: applying PUSCH mapping type B to each of the plurality of radio resources; and transmitting a demodulation reference signal (DMRS) for the PUSCH based on the plurality of radio resources and the PUSCH mapping type B.

In another aspect of the present disclosure, a UE configured to transmit a PUSCH in a wireless communication system is provided. The UE may include: at least one transceiver; at least one processor; and at least one computer memory operably connected to the at least one processor and configured to store instructions that, when executed, cause the at least one processor to perform operations. The operations may include: receiving a resource allocation for the PUSCH; determining a plurality of radio resources based on the resource allocation; and repeatedly transmitting the PUSCH based on the plurality of radio resources. Repeatedly transmitting the PUSCH may include: applying PUSCH mapping type B to each of the plurality of radio resources; and transmitting a DMRS for the PUSCH based on the plurality of radio resources and the PUSCH mapping type B.

In another aspect of the present disclosure, an apparatus for a UE is provided. The apparatus may include: at least one processor; and at least one computer memory operably connected to the at least one processor and configured to store instructions that, when executed, cause the at least one processor to perform operations. The operations may include: receiving a resource allocation for a PUSCH; determining a plurality of radio resources based on the resource allocation; and repeatedly transmitting the PUSCH based on the plurality of radio resources. Repeatedly transmitting the PUSCH may include: applying PUSCH mapping type B to each of the plurality of radio resources; and transmitting a DMRS for the PUSCH based on the plurality of radio resources and the PUSCH mapping type B.

In another of the present disclosure, a computer-readable storage medium is provided. The computer-readable storage medium may be configured to store at least one computer program including instructions that, when executed by at least one processor, cause the at least one processor to perform operations for a UE. The operations may include: receiving a resource allocation for a PUSCH; determining a plurality of radio resources based on the resource allocation; and repeatedly transmitting the PUSCH based on the plurality of radio resources. Repeatedly transmitting the PUSCH may include: applying PUSCH mapping type B to each of the plurality of radio resources; and transmitting a DMRS for the PUSCH based on the plurality of radio resources and the PUSCH mapping type B.

In another aspect of the present disclosure, a method of receiving a PUSCH by a base station (BS) in a wireless communication system is provided. The method may include: transmitting a resource allocation for the PUSCH to a UE; determining a plurality of radio resources based on the resource allocation; and repeatedly receiving the PUSCH based on the plurality of radio resources. Repeatedly receiving the PUSCH may include: applying PUSCH mapping type B to each of the plurality of radio resources; and receiving a DMRS for the PUSCH based on the plurality of radio resources and the PUSCH mapping type B.

In a further aspect of the present disclosure, a BS configured to receive a PUSCH in a wireless communication system is provided. The BS may include: at least one transceiver; at least one processor; and at least one computer memory operably connected to the at least one processor and configured to store instructions that, when executed, cause the at least one processor to perform operations. The operations may include: transmitting a resource allocation for the PUSCH to a UE; determining a plurality of radio resources based on the resource allocation; and repeatedly receiving the PUSCH based on the plurality of radio resources. Repeatedly receiving the PUSCH may include: applying PUSCH mapping type B to each of the plurality of radio resources; and receiving a DMRS for the PUSCH based on the plurality of radio resources and the PUSCH mapping type B.

In each aspect of the present disclosure, determining the plurality of radio resources may include: determining a plurality of nominal resources based on a repetition factor configured for the UE and the resource allocation; and determining a plurality of actual resources based on the plurality of nominal resources. Each of the plurality of radio resources may be an actual resource.

In each aspect of the present disclosure, the plurality of nominal resources may be consecutive in a time domain.

In each aspect of the present disclosure, each of the plurality of actual resources may be a set of consecutive symbols in a slot.

In each aspect of the present disclosure, the DMRS may be mapped from a first symbol of each of the plurality of radio resources based on the PUSCH mapping type B.

In each aspect of the present disclosure, applying the PUSCH mapping type B to each of the plurality of radio resources may include applying the PUSCH mapping type B together with the resource allocation regardless of a PUSCH mapping type provided to the UE.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
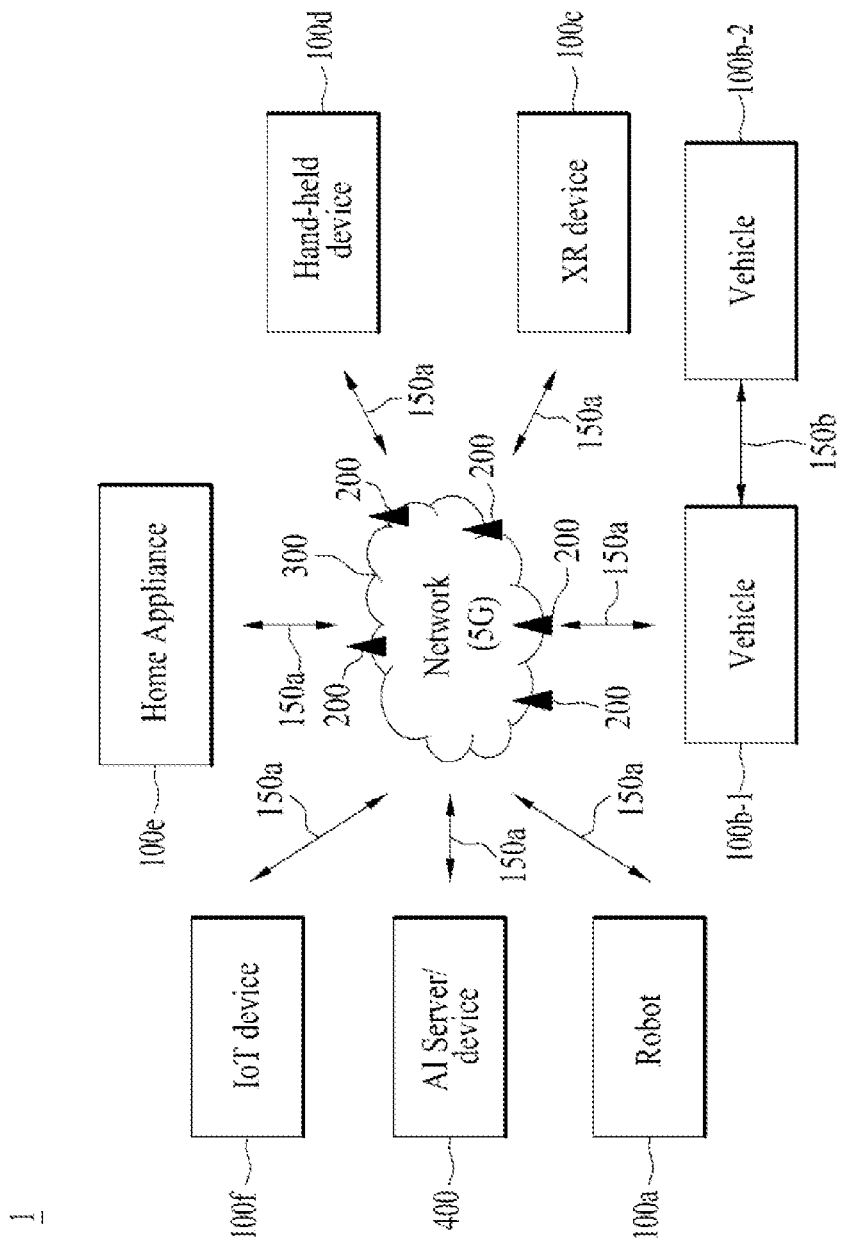
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s))

transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

In the present disclosure, radio resources (e.g., time-frequency resources) scheduled or configured to a UE by a BS for transmission or reception of a PUCCH/PUSCH/PDSCH is also referred to as PUCCH/PUSCH/PDSCH resources.

As more and more communication devices have required greater communication capacity, there has been a need for enhanced mobile broadband (eMBB) communication relative to legacy radio access technology (RAT). In addition, massive MTC (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
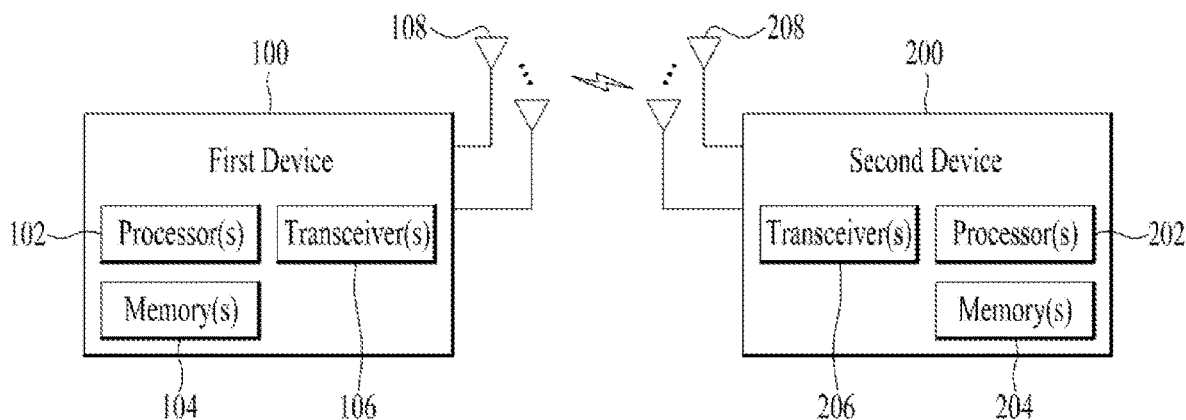
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
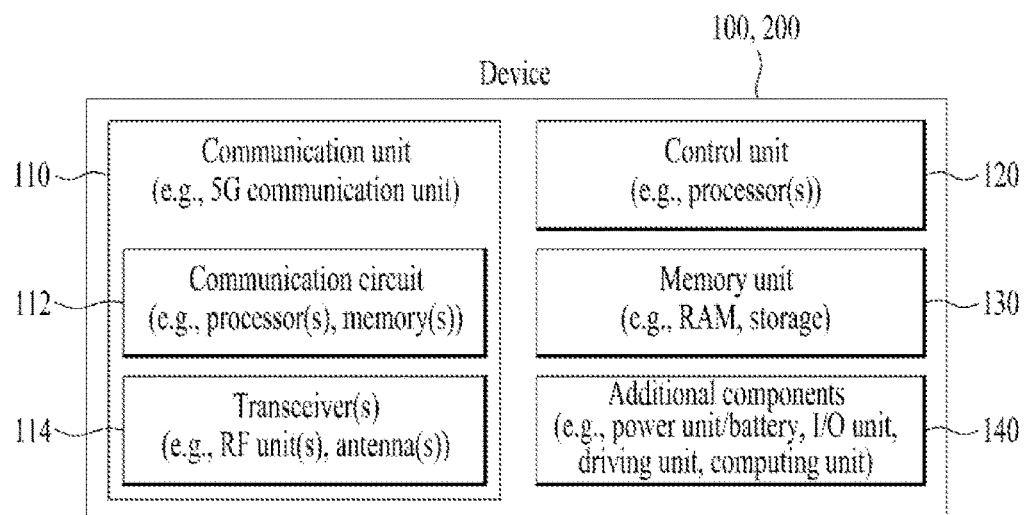
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

In the present disclosure, a communication device or apparatus may include at least one processor; and at least one computer memory operably connected to the at least one processor and configured to store instructions that, when executed, cause the at least one processor to perform operations according to example(s) of the present disclosure.

Figure 4:
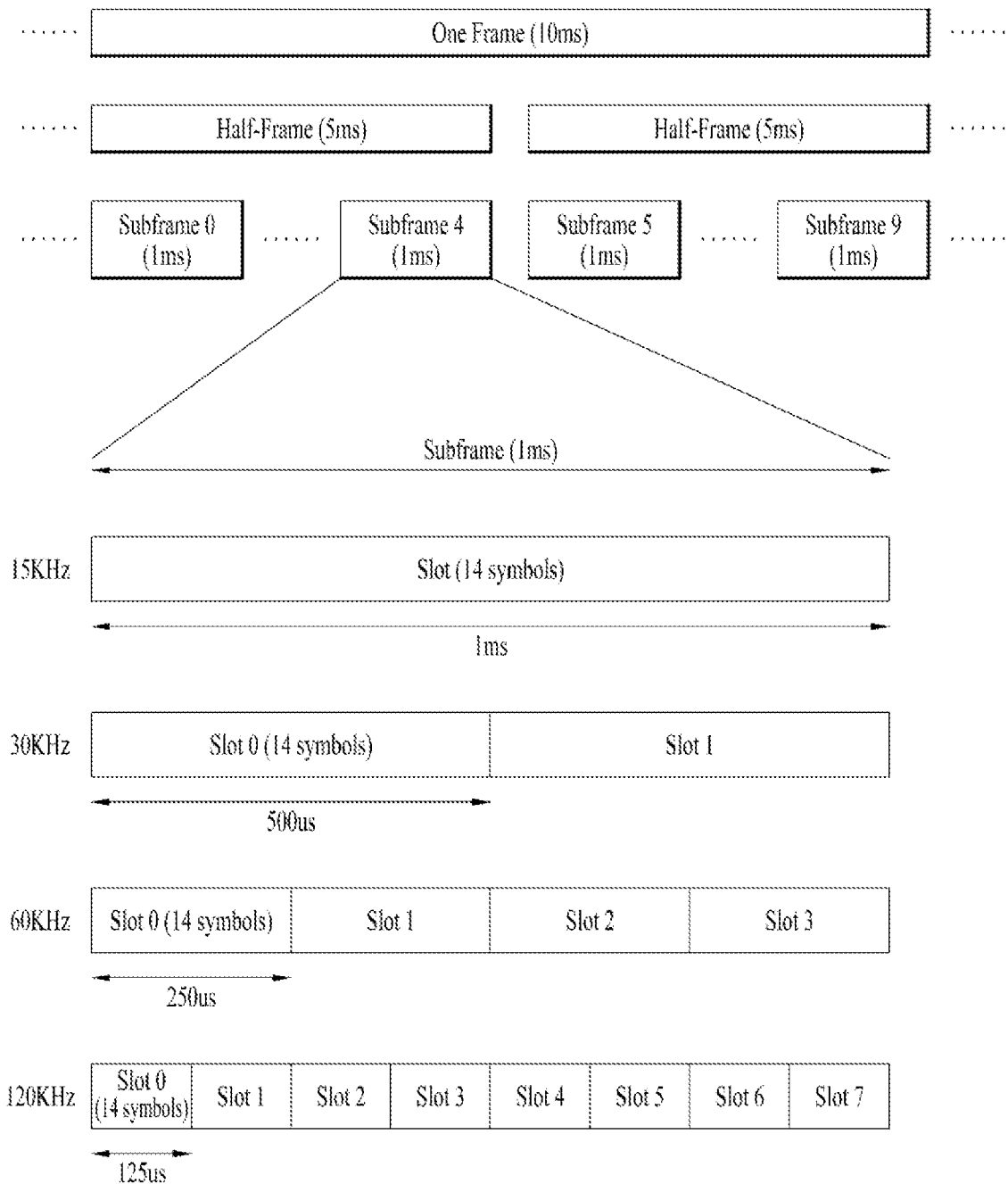
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably Referring to FIG. 4, in the NR system, UL and DL transmissions are organized into frames. Each frame has a duration of $T_f = (\Delta f_{max} * N_f / 100) * T_c = 10$ ms and is divided into two half-frames each having a duration of 5 ms. Here, the basic time unit for NR is $T_c = 1/(\Delta f_{max} * N_f)$, where $f_{max} = 480*10^3$ Hz and $N_f = 4096$. For reference, the basic time unit for LTE is $T_s = 1/(\Delta f_{ref} * N_{f,ref})$, where $\Delta f_{ref} = 15*10^3$ Hz and $N_{f,ref} = 2048$. $T_c$ and $T_f$ have the following relationship: constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable sub-carrier spacing of $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing of $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

Figure 5:
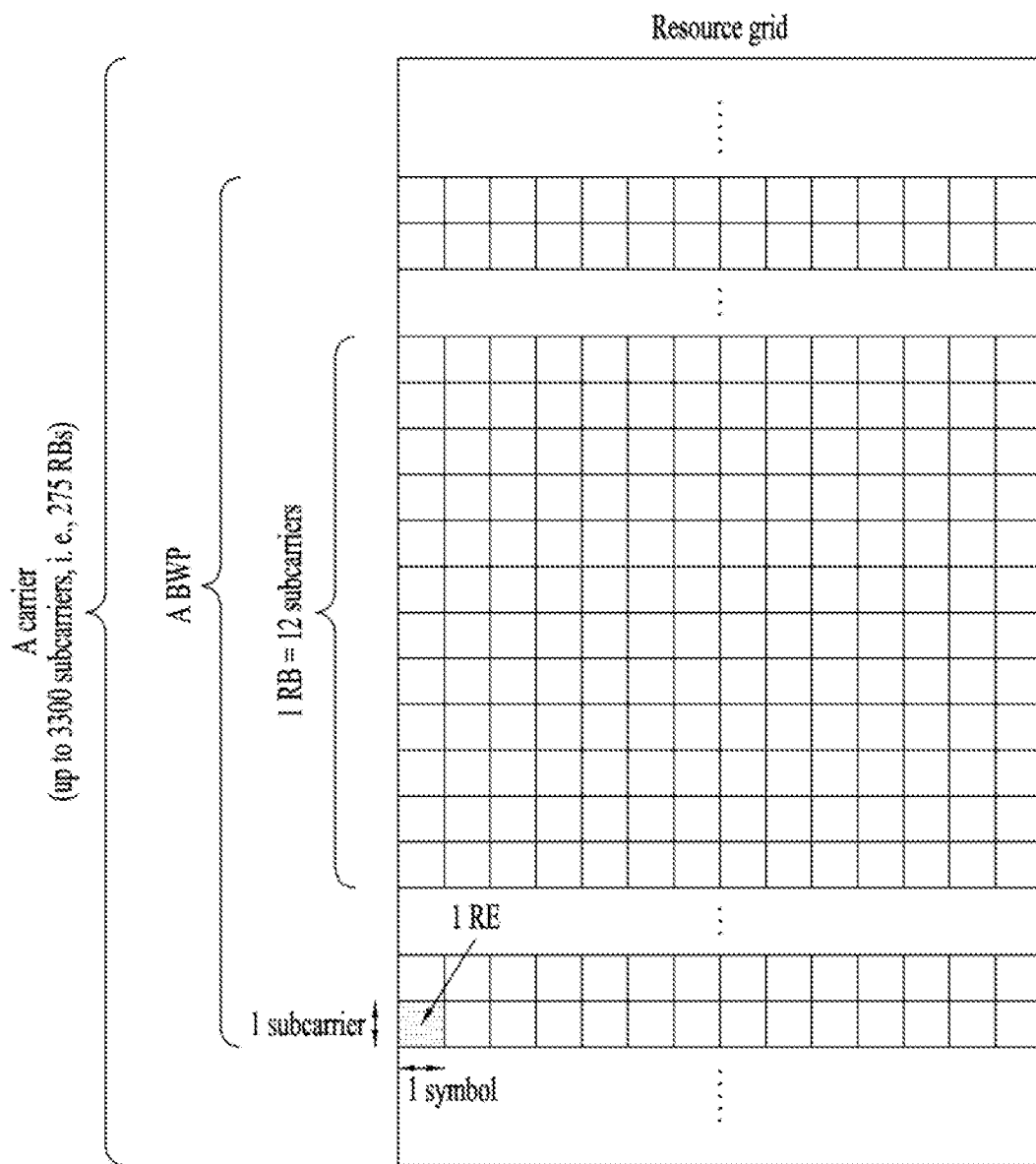
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{CRB} = n_{CRB} + N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

Figure 6:
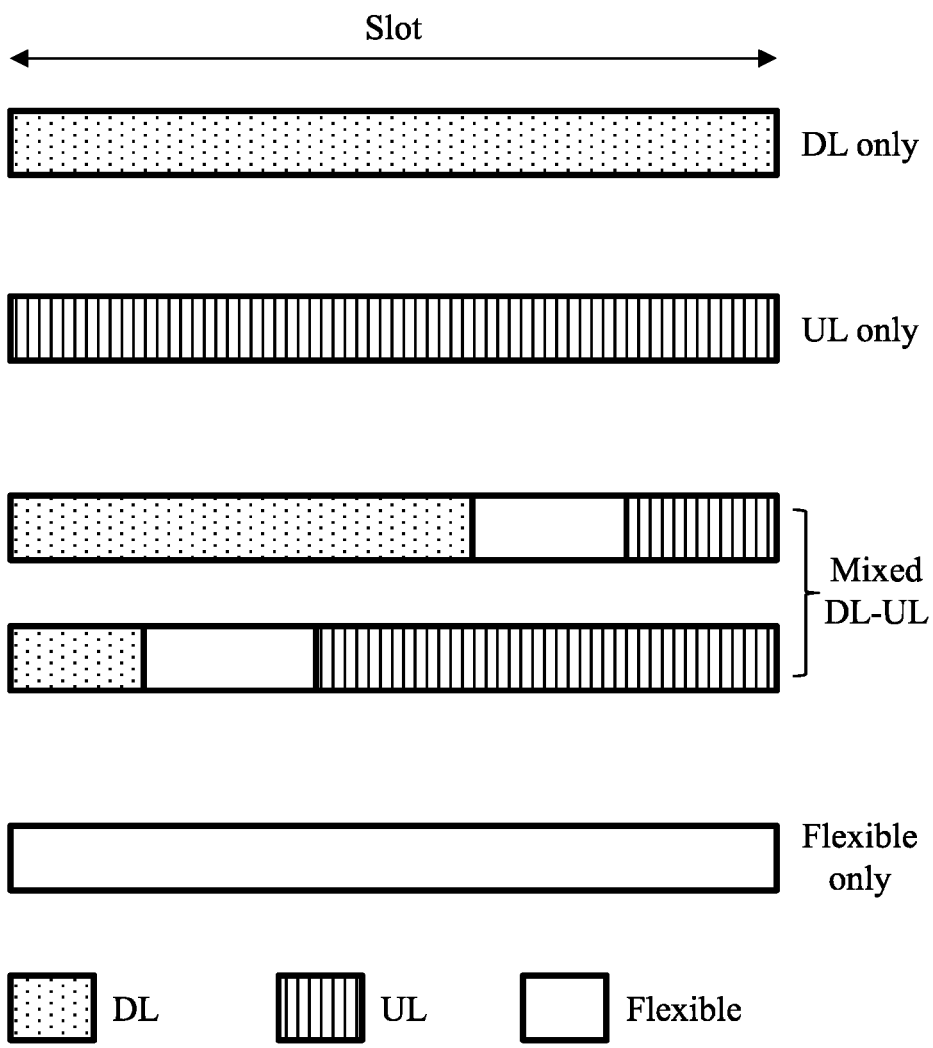
FIG. 6 is a diagram illustrating a resource grid of a slot.

FIG. 6 is a diagram illustrating exemplary slot structures which may be used in the 3GPP-based system. In every 3GPP-based system, for example, the NR system, each slot may have a self-contained structure with i) a DL control channel, ii) DL or UL data, and/or iii) a UL control channel. For example, the first N symbols of a slot may be used to deliver a DL control channel (hereinafter, referred to as a DL control region), and the last M symbols of the slot may be used to deliver a UL control channel (hereinafter, referred to as a UL control region). Each of N and M is 0 or a positive integer. A resource region (hereinafter, referred to as a data region) between the DL control region and the UL control region may be used to deliver DL data or UL data. The symbols of a single slot may be divided into group(s) of consecutive symbols available as DL symbols, UL symbols, or flexible symbols. Hereinbelow, information specifying the usages of symbols in a slot is referred to as a slot format. For example, a slot format may define which symbols are to be used for UL and which symbols are to be used for DL.

When a serving cell is to be operated in a TDD mode, the BS may configure a UL and DL allocation pattern for the serving cell by higher-layer signaling (e.g., RRC signaling). For example, the following parameters may be used to configure a TDD DL-UL pattern:

dl-UL-TransmissionPeriodicity indicating the periodicity of a DL-UL pattern;

nrofDownlinkSlots indicating the number of consecutive full DL slots at the beginning of each DL-UL pattern, where a full DL slot is a slot including DL symbols only;

nrofDownlinkSymbols indicating the number consecutive DL symbols at the beginning of the slot following the last full DL slot;

nrofUplinkSlots indicating the number of consecutive full UL slots at the end of each DL-UL pattern, where a full UL slot is a slot including UL symbols only; and nrofUplinkSymbols indicating the number of consecutive UL symbols at the end of the slot preceding the first full UL slot.

The remaining symbols configured neither as DL nor as UL among the symbols of the DL-UL pattern are flexible symbols.

Upon receipt of a configuration for a TDD DL-UL pattern, that is, a TDD UL-DL configuration (e.g., tdd-UL-DL-ConfigurationCommon or tdd-UL-DLConfigurationDedicated) by higher-layer signaling, the UE sets a slot format for each slot across the slots.

Although various combinations may be produced out of DL symbols, UL symbols, and flexible symbols, a specific number of combinations may be predefined as slot formats, and the predefined slot formats may be identified by slot format indexes. The following table lists some of the predefined slot formats. In the table, D denotes DL symbol, U denotes UL symbol, and F denotes flexible symbol.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |

TABLE 3-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which one of the predefined slot formats to be used for a specific slot, the BS may configure a set of slot format combinations available for each serving cell in a set of serving cells by higher-layer signaling (e.g., RRC signaling), and configure the UE to monitor a group-common PDCCH for slot format indicator(s) (SFI(s)) by higher-layer signaling (e.g., RRC signaling). DCI carried on the group-common PDCCH for the SFI(s) is referred to as SFI DCI. DCI format 2_0 is used for the SFI DCI. For example, for each serving cell in a set of serving cells, the BS may provide the UE with the (starting) position of a slot format combination ID (i.e., SFI-index) for the serving cell, a set of slot format combinations applicable to the serving cell, and a reference SCS configuration for each slot format in a slot format combination indicated by an SFI-index value in the SFI DCI. For each slot format combination in the set of slot format combinations, one or more slot formats are configured and a slot format combination ID (i.e., SFI-index) is assigned. For example, when the BS is to configure a slot format combination with N slot formats, the BS may indicate N ones of slot format indexes for the predefined slot formats (e.g., refer to Table 4) for the slot format combination. To configure the UE to monitor the group-common PDCCH for SFIs, the BS indicates an RNTI used for SFIs, SFI-RNTI and the total length of DCI payload scrambled with the SFI-RNTI to the UE. Upon detection of a PDCCH based on the SFI-RNTI, the UE may determine slot format(s) for a corresponding serving cell from an SFI-index for the serving cell among SFI-indexes in DCI payload of the PDCCH.

Symbols indicated as flexible by a TDD DL-UL pattern configuration may be indicated as UL, DL, or flexible by SFI DCI. Symbols indicated as DL/UL by the TDD DL-UL pattern configuration are not overridden as UL/DL or flexible by the SFI DCI.

When the UE is not configured with a TDD DL-UL pattern, the UE determines for each slot whether the slot is for UL or DL, and symbols allocation in the slot based on SFI DCI and/or DCI that schedules or triggers a DL or UL signal transmission (e.g., DCI format 1_0, DCI format 1_1, DCI format 1_2, DCI format 0_0, DCI format 0_1, DCI format 0_2, and DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS.

Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, FR1 and FR2, and FR2 is also referred to as a millimeter wave (mmW). The following table below shows frequency ranges in which NR is operable.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. DCI including information about resource allocation of a DL-SCH is called PDSCH scheduling DCI, and DCI including information about resource allocation of a UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET associated with a search space set.

monitoringSlotPeriodicityAndOffset: a PDCCH monitoring periodicity and a PDCCH monitoring offset to configure slots for PDCCH monitoring.

duration: the number of consecutive slots where a search space lasts in every occasion, i.e., at every period as given by monitoringSlotPeriodicityAndOffset.

monitoringSymbolsWithinSlot: an in-slot PDCCH monitoring pattern for representing the first symbol(s) of CORESET(s) in slots for PDCCH monitoring.

nrofCandidates: the number of PDCCH candidates for each CCE aggregation level.

The UE monitors PDCCH candidates only on PDCCH monitoring occasions. The UE determines a PDCCH monitoring occasion based on the PDCCH monitoring periodicity, the PDCCH monitoring offset, and the in-slot PDCCH monitoring pattern. The parameter monitoringSymbolsWithinSlot indicates, for example, the first symbol(s) for PDCCH monitoring in slots configured for PDCCH monitoring (see the parameters monitoringSlotPeriodicityAndOffset and duration). For example, if monitoringSymbolsWithinSlot is configured with 14 bits, the most significant (left) bit represents the first OFDM symbol in a slot, and the second most significant (left) bit represents the second OFDM symbol in the slot. In this way, the bits of monitoringSymbolsWithinSlot may represent 14 OFDM symbols of a slot, respectively. For example, among the bits of monitoringSymbolsWithinSlot, bit(s) set to 1 may identify the first symbol(s) of CORESET(s) within a slot.

Table 5 shows search space sets, related RNTIs, and use cases thereof.

TABLE 5

| Search Space Set | RNTI | Use Case |
|---|---|---|
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

Table 6 shows DCI formats carried by a PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. In the case of a CSS, each of DCI format 0_0 and DCI format 1_0 has a fixed size after the size of a BWP is initially given by RRC. In the case of USS, except for a frequency domain resource assignment (FDRA) field, the remaining fields of each of DCI format 0_0 and DCI format 1_0 have fixed sizes. However, the size of the FDRA field may be changed by the configuration of related parameters by the BS. In DCI format 0_1 and DCI format 1_1, the size of a DCI field may be changed by various RRC reconfigurations by the BS. DCI format 2_0 may be used to provide dynamic slot format information (e.g., SFI DCI) to the UE, and DCI format 2_1 may be used to provide DL pre-emption information to the UE.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as an HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 7, (0) PUCCH format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 7

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.—PUCCH resource set #0, if the number of UCI bits=<2

PUCCH resource set #1, if 2<the number of UCI bits=<$N_1$
  . . .
  PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 7).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail. Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 10:
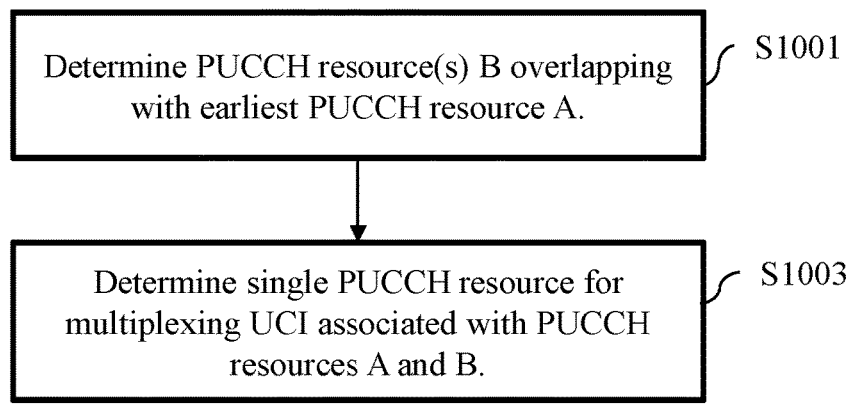
FIG. 10 illustrates an example of a process for a user equipment (UE) having physical uplink control channels (PUCCHs) overlapping in a single slot to handle a collision between uplink (UL) channels.

FIG. 10 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. For PDSCH/PUSCH mapping type A, a DMRS is mapped to a PDSCH/PUSCH resource with respect to the start of a slot, and one or two symbols among symbols of the PDSCH/PUSCH resource may be used as DMRS symbol(s) according to other DMRS parameters. For example, in the case of PDSCH/PUSCH mapping type A, the DMRS is located at the third symbol (symbol #2) or the fourth symbol (symbol #3) of the slot according to RRC signaling. For PDSCH/PUSCH mapping type B, a DMRS is mapped with respect to the first OFDM symbol of a PDSCH/PUSCH resource. According to other DMRS parameters, one or two symbols from the first symbol of the PDSCH/PUSCH resource may be used as DMRS symbol(s). For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in the present disclosure, PUSCH mapping type A is also referred to as mapping type A or DMRS mapping type A, and PUSCH mapping type B is also referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 8 and Table 9. Table 8 shows an example of special fields for DL SPS and UL grant Type 2 scheduling activation PDCCH validation, and Table 9 shows an example of special fields for DL SPS and UL grant Type 2 scheduling release PDCCH validation.

TABLE 8

| | DCI format 0_0/0_1 | DCI format 1_0 | DCI format 1_1 |
|---|---|---|---|
| HARQ process number | set to all '0's | set to all '0's | set to all '0's |

TABLE 8-continued

| | DCI format 0_0/0_1 | DCI format 1_0 | DCI format 1_1 |
|---|---|---|---|
| Redundancy version | set to '00' | set to '00' | For the enabled transport block: set to '00' |

TABLE 9

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
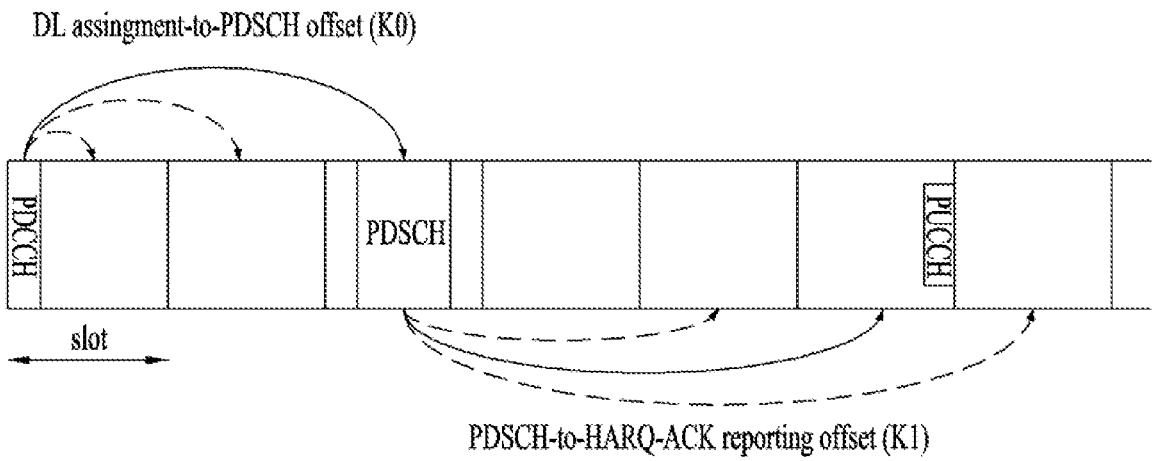
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

- UCI: UCI implies control information that the UE transmits on UL. The UCI includes multiple types of control information (i.e., UCI types). For example, the UCI may include HARQ-ACK (shortly, A/N or AN), SR, and/or CSI.
- UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.
- UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.
- Slot: Slot means a basic time unit or time interval for data scheduling. A slot includes a plurality of symbols. Here, a symbol may be an OFDM-based symbol (e.g., a CP-OFDM symbol or DFT-s-OFDM symbol).
- Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 9:
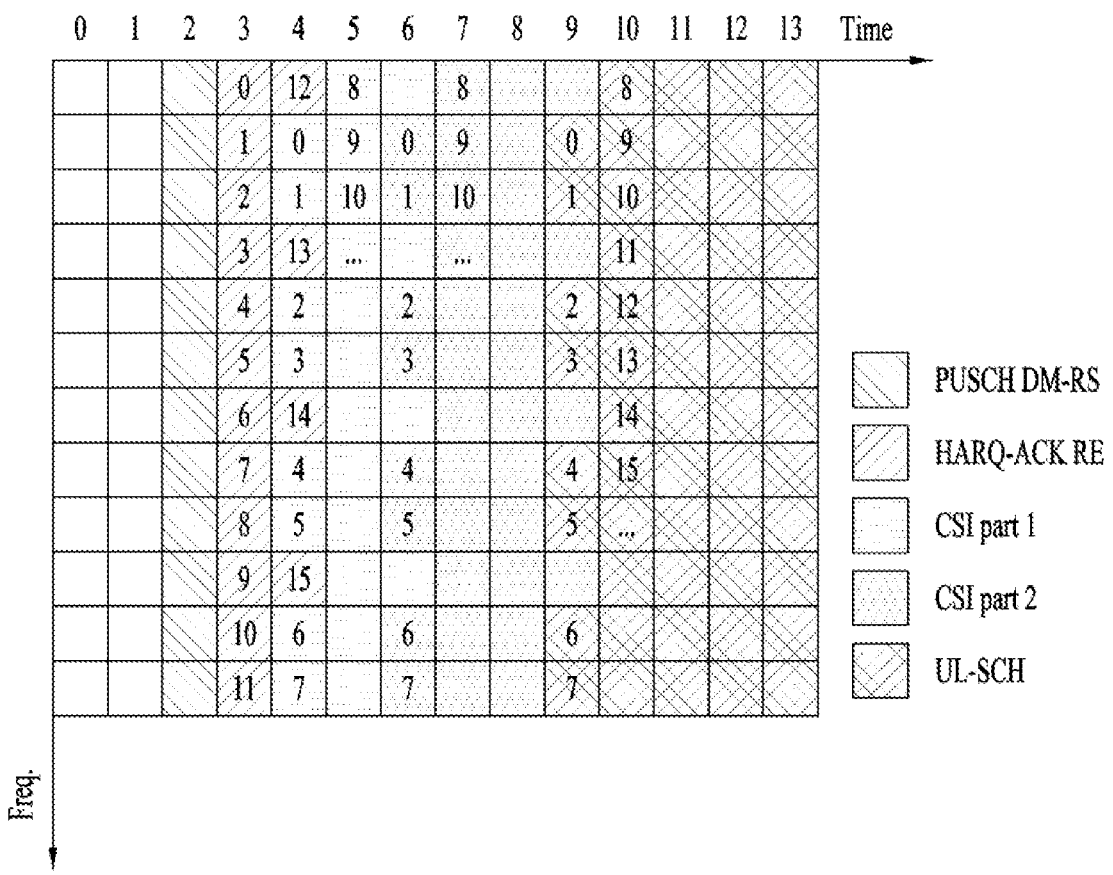
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
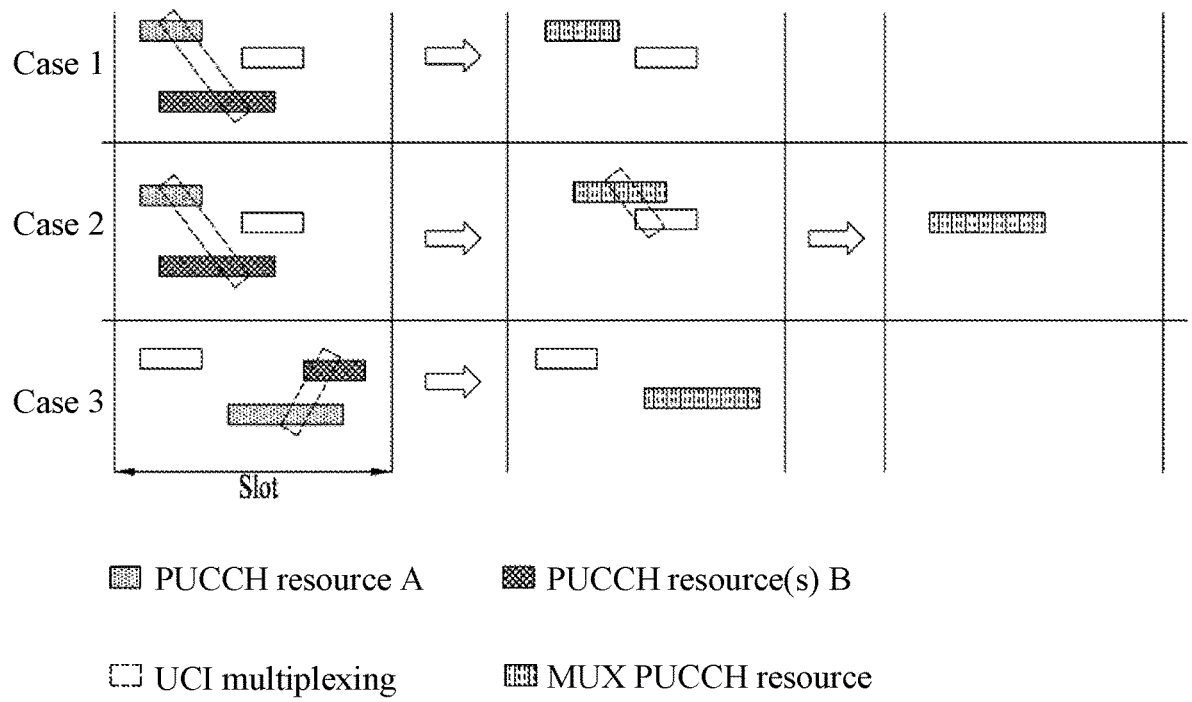
FIG. 11 illustrates cases of multiplexing UCI according to FIG. 10.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
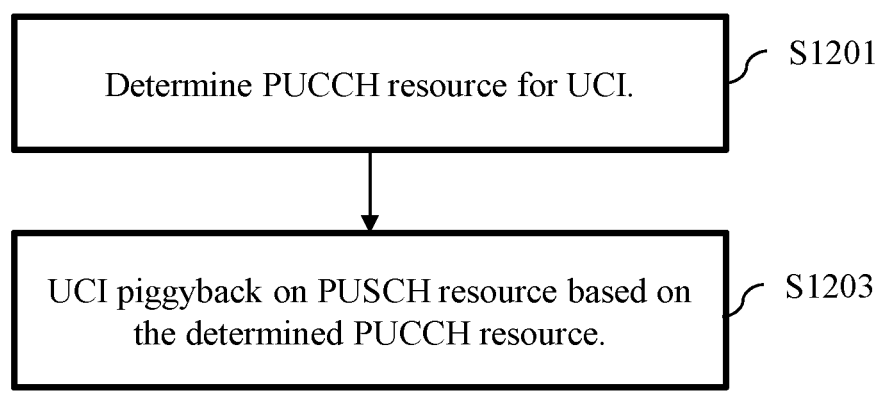
FIG. 12 illustrates a process for a UE having a PUCCH and a PUSCH overlapping in a single slot to handle a collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1503 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
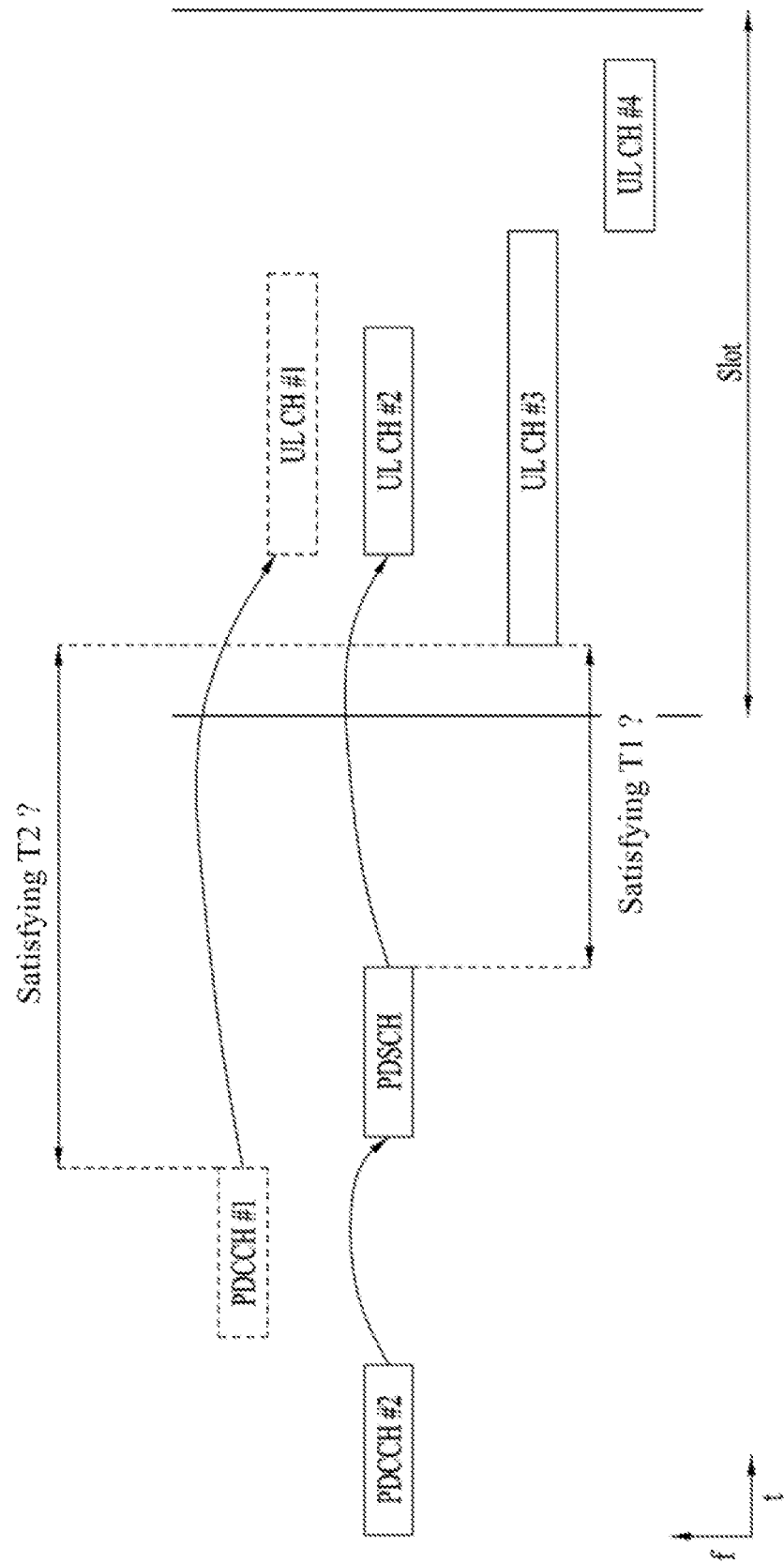
FIG. 13 illustrates UCI multiplexing in consideration of a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

For example, T1 may be determined as follows: $T1=(N1+d1)*(2048+144)*\kappa*2^{-u}*T_c$. N1 is based on u of Table 10 and Table 11 for UE processing capabilities #1 and #2, respectively, and u is one of ($u_{PDCCH}$, $u_{PDSCH}$, $u_{UL}$), that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_s/T_f=64$. In Table 10, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for a PDSCH mapping type A is present on an i-th slot, $d1=7_{-i}$ for i<7 and, otherwise, d1=0. If the PDSCH has a mapping type B for UE processing capability #1, d1 may be 0 when the number of allocated PDSCH symbols is 7, d1 may be 3 when the number of allocated PDSCH symbols is 4, d1 may be 0 when the number of allocated PDSCH symbols is 7, d1 may be 3 when the number of allocated PDSCH symbols is 4, and d1 may be 3+d when the number of allocated PDSCH symbols is 2, where d is the number of overlapping symbols of the scheduling PDCCH and the scheduled PDSCH. If the PDSCH mapping type is B for UE processing capability #2, d1 may be 0 when the number of allocated PDSCH symbols is 7, and d1 may correspond to the number of overlapping symbols of the scheduling PDCCH and the scheduled PDSCH when the number of allocated PDSCH symbols is 4. Further, if the number of allocated PDSCH symbols is 2, d1 may be 3 when the scheduling PDSCH is within a 3-symbol CORESET and the CORESET and the PDSCH have the same start symbol, and d1 may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc. d2 may be categorized into $d_{2,1}$ related to the scheduled symbol position and $d_{2,2}$ related to BWP switching.

For example, T2 may be determined as follows: T2=max{ $(N2+d_{2,1})*(2048+144)*\kappa*2^{-\mu}*T_c, d_{2,2}$}. N2 is based on u of Table 12 and Table 13 for UE timing capabilities #1 and #2, respectively, and u is one of $(u_{DL}, u_{UL})$, that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_s/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 10 shows a PDSCH processing time for PDSCH processing capability #1 of the UE, Table 11 shows a PDSCH processing time for PDSCH processing capability #2 of the UE, Table 12 shows a PUSCH preparation time for PDSCH processing capability #1 of the UE, and Table 13 shows a PUSCH processing time for PDSCH processing capability #2 of the UE.

TABLE 10

| | PDSCH decoding time N1 [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 12

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 13

| u/SCS | PUSCH preparation time N2 [symbols] |
|---|---|
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 14:
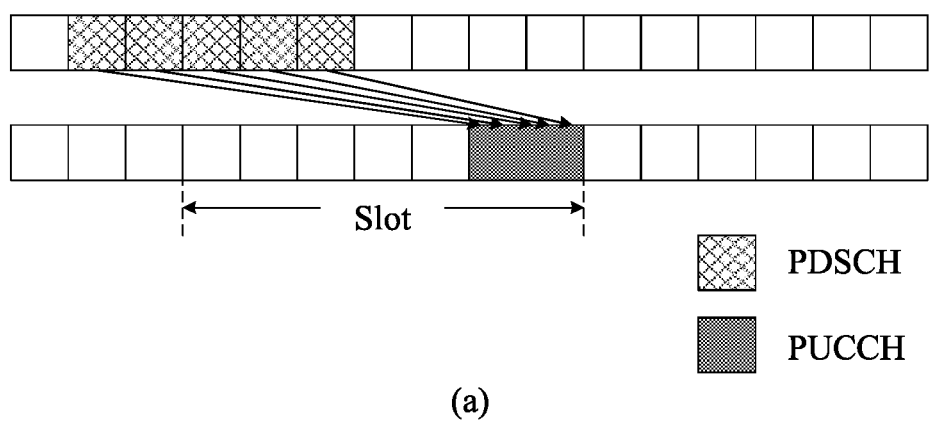
FIG. 14 illustrates transmission of HARQ-ACK feedbacks for a plurality of PDSCHs.
Figure 14:
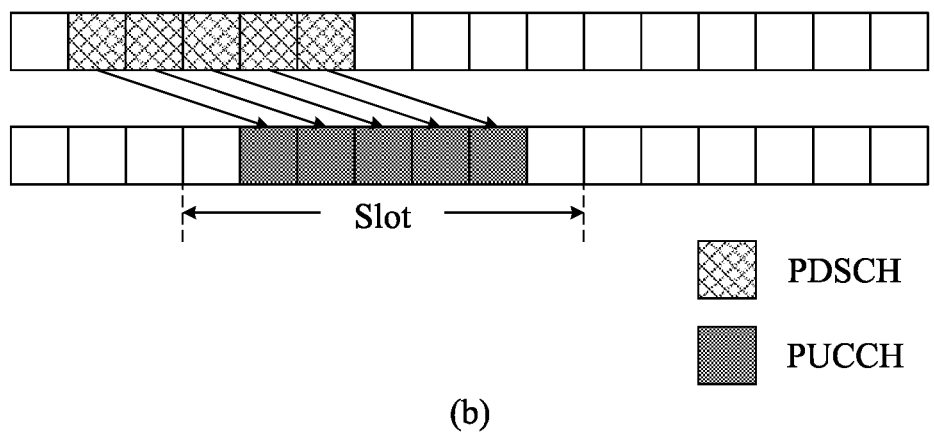

FIG. 14 illustrates transmission of HARQ-ACK feedbacks for a plurality of PDSCHs. In particular, FIG. 14(a) illustrates back-to-back scheduled PDSCHs and a single PUCCH including HARQ-ACK feedbacks therefor in a slot, and FIG. 14(b) illustrates back-to-back scheduled PDSCHs and a plurality of HARQ-ACK PUCCHs therefor in a slot.

In some scenarios, it may be regulated that the UE is not expected to transmit a PUCCH with HARQ-ACK information in more than one slot. In this case, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed with one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. When it is regulated that the UE configures a HARQ-ACK codebook to be included in one PUCCH in a slot based on HARQ-ACK feedbacks for a plurality of PDSCHs, the HARQ-ACK payload size may relatively increase, and as a result, PUCCH transmission performance may be degraded. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback as illustrated in FIG. 14(a). Accordingly, in order to flexibly and efficiently use resources and to support services, it is better to transmit a plurality of (non-overlapping) HARQ-ACK PUCCHs (or PUSCHs) in one slot as illustrated in FIG. 14(b).

One of the representative scenarios of the next system, URLLC has the low-latency and high-reliability requirements of a user-plane delay of 0.5 ms and transmission of X bytes of data within 1ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

Depending on application fields or traffic types, various reference time units may be assumed/used to transmit/receive a physical channel. A reference time may be a basic unit for scheduling a specific physical channel, and a reference time unit may be changed according to the number of symbols and/or a subcarrier spacing (SCS) in the scheduling time unit. Some embodiments/implementations of the present disclosure are described in the context of a slot or mini-slot as a reference time unit, for convenience of description. A slot may be, for example, a basic scheduling unit used for general data traffic (e.g., eMBB). A mini-slot may have a shorter duration than a slot in the time domain, and may be a scheduling basic unit used for a special purpose or for a special communication scheme (e.g., URLLC, an unlicensed band, or millimeter wave). However, the embodiment(s)/implementation(s) of the present disclosure may also be applied to physical channel transmission/reception in mini slots for eMBB or physical channel transmission/reception in slots for URLLC or other communication schemes.

For services with strict latency and reliability requirements (e.g., URLLC service), the reliability of PUSCH/PDSCH transmission may need to be higher than that of conventional PUSCH/PDSCH transmission. To improve the reliability of PUSCH/PDSCH transmission, the PUSCH/PDSCH transmission may be repeated. If a plurality of PUSCHs/PDSCHs are transmitted in one slot, frequency hopping for changing frequency resources between PUSCH/PDSCH transmissions may be additionally considered to secure the reliability based on frequency diversity.

Figure 15:
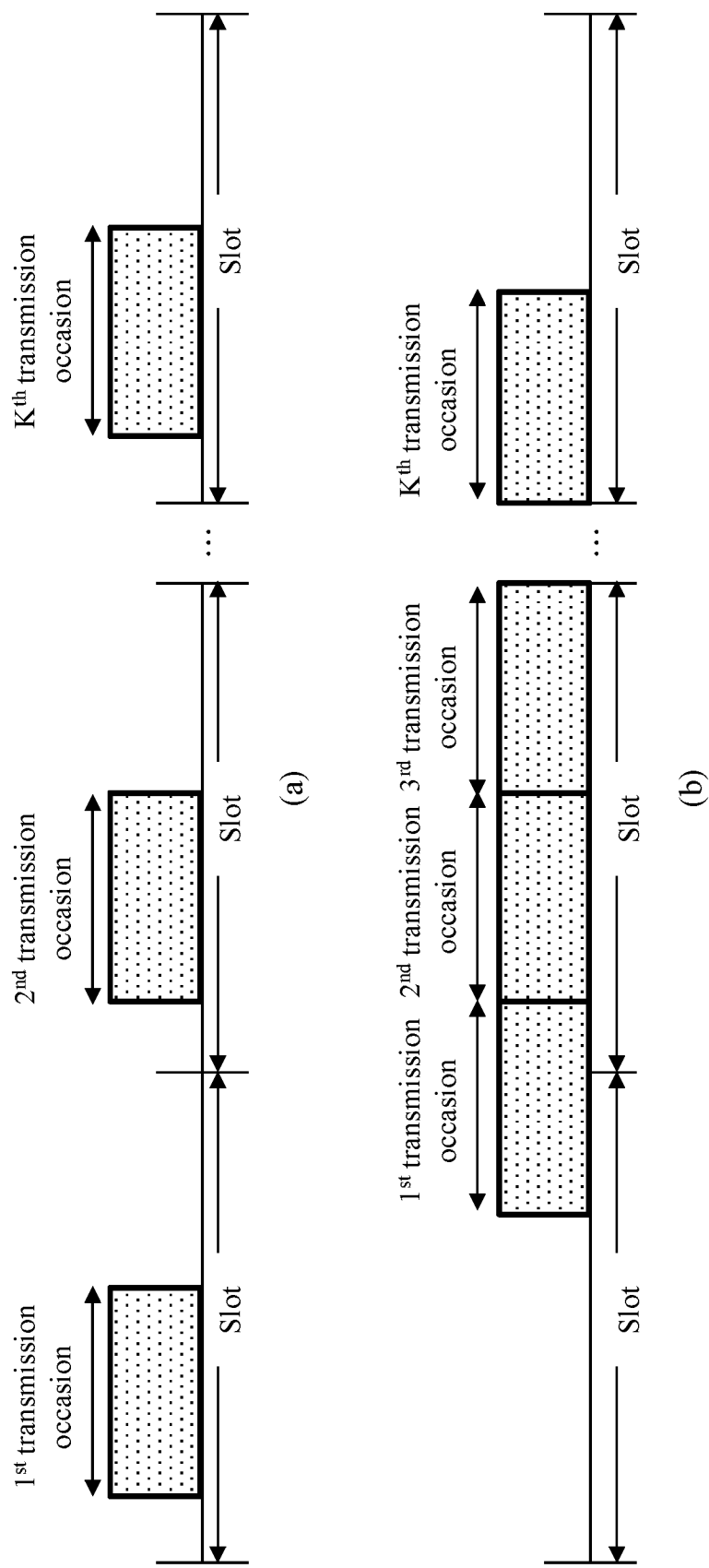
FIG. 15 illustrates types of repeated transmission.

FIG. 15 illustrates types of repetition transmission. Two types of repetition transmission may be scheduled. In some implementations of the present disclosure, PUSCH/PDSCH repetitions may be applied to PUSCH/PDSCH transmission based on a dynamic UL grant/DL assignment over the PDCCH. In addition, the PUSCH/PDSCH repetitions may also be applied to PUSCH/PDSCH transmission based on a configured grant. Repetitions to be applied to the PUSCH/PDSCH transmission may be indicated or configured by the BS to the UE. For example, the UE may receive a repetition factor K from the BS through L1 signaling or higher layer signaling. When the UE is indicated or configured with the repetition factor K used to indicate the number of repetition transmissions, the UE may repeat TB transmission/reception over K transmission/reception occasions. In the present disclosure, the repetition factor is also referred to as a repetition transmission factor.

The UE may be configured to perform multi-slot PUSCH transmission or multi-slot PDSCH reception. For example, referring to FIG. 15(a), the UE may be instructed by the BS to apply an allocation of the same symbol(s) across K consecutive slots, where K is an integer greater than one. In this case, the UE repeats TB transmission/reception over the K consecutive slots by applying the allocation of the same slot(s) to each of the K consecutive slots. In the present disclosure, an occasion on which one TB is capable of being transmitted/received may be referred to as a transmission occasion/reception occasion.

If symbols of a slot allocated for a PUSCH/PDSCH are determined as DL/UL symbols by a TDD UL-DL configuration and/or SFI DCI through higher layer signaling, the UE may omit transmission/reception in the slot for multi-slot PUSCH/PDSCH transmission/reception.

Hereinafter, PUSCH/PDSCH repetitions performed by applying the same resource allocation over multiple consecutive slots is referred to as PUSCH/PDSCH repetition type A. In the case of PUSCH/PDSCH repetition type A, when the UE receives a resource allocation for radio transmission from the BS, the UE may repeatedly use time-frequency resources defined in one slot on a slot basis.

When the BS allows the UE to perform PUSCH/PDSCH transmission/reception over a plurality of consecutive slots based on the same resource allocation, the BS needs to secure the plurality of consecutive slots. In this case, it may be difficult to achieve flexible resource allocation. In addition, when the BS intends to perform PDCCH transmission and PUSCH/PDSCH transmission within one slot to secure the latency, the PUSCH/PDSCH repetitions for reliability improvement may cause a large delay because only several symbols of the latter half of the slot may be used as PUSCH/PDSCH transmission occasions. Meanwhile, in the case of PUSCH/PDSCH transmission based on a configured grant, the resource allocation for one TB may always be determined within one period of the configured grant. For example, a time duration for transmission of K repetitions for one TB may not exceed a time duration induced by the period P of the configured grant. In some embodiments/implementations of the present disclosure, the UE transmits/receives a PUSCH/PDSCH only at a predetermined position among a plurality of PUSCH/PDSCH resources for PUSCH/PDSCH repetitions based on a redundancy version (RV) sequence. For example, in some embodiments/implementations, if the configured RV sequence is {0, 2, 3, 1}, the UE starts initial transmission of a TB at the first transmission occasion among K transmission occasions of the K repetitions. In this case, a long time may be required to secure the reliability of PUSCH/PDSCH transmission, or it may be difficult to configure a short period using a plurality of PUSCH resources. In particular, when TB transmission starts in the middle of a plurality of PUSCH/PDSCH resources within the period of the configured grant, that is, at an intermediate transmission occasion among the transmission occasions, it may be difficult to repeat the transmission a sufficient number of times. Therefore, it is discussed in next radio access technologies that for URLLC, resources are configured regardless of slot boundaries or resources are repeated on a symbol basis in order to achieve more flexible scheduling. For flexible and efficient resource use and service support and fast and robust UL/DL channel transmission, it may be necessary, for example, to repeat a PUSCH/PDSCH at an interval shorter than the slot or to allocate resources for PUSCH/PDSCH repetitions regardless of slot boundaries.

Referring to FIG. 15(b), the UE may be indicated or configured by the BS to perform PUSCH/PDSCH repetitions back-to-back. Hereinafter, a PUSCH/PDSCH repetition for which radio resources for the PUSCH/PDSCH repetition are concatenated back-to-back in the time domain may be referred to as PUSCH/PDSCH repetition type B.

Hereinafter, for convenience of description, the examples of the present disclosure will be described on the assumption that the UE repeats PUSCH transmission. For example, the examples of the present disclosure will be described regarding a PUSCH and a DMRS for the PUSCH. However, the examples of the present disclosure may be applied even when the UE repeats PDSCH reception based on configurations and/or scheduling from the BS. In addition, the examples of the present disclosure may be applied when the BS transmits L1 signaling (e.g., DCI) and/or higher layer signaling (e.g., RRC signaling) in order to indicate or configure to the UE transmission of a prescribed RS (e.g., phase tracking RS (PT-RS), sounding RS (SRS), etc.).

When a UE and BS perform repetition transmission or repetition reception on each of a plurality of radio resources, the UE and BS may need to assume the same positions for RS symbols. In particular, depending on signaling methods, the UE may need to use only one RS parameter value for radio resources given to the UE regardless of the number of radio resources used by the UE. In other words, in some implementations of the present disclosure, the UE may need to apply one RS parameter value on transmission/reception occasions related to channel repetitions. When the UE attempt to apply one RS parameter value to a plurality of radio resources, the UE cannot apply the corresponding RS parameter value or may not determine the most effective RS symbol position due to the restrictions or prerequisites of different RS parameters. Alternatively, there may be no RS symbol positions in a corresponding resource region.

Hereinafter, examples of an optimized method for determining an RS symbol position when a UE and BS perform repetition transmission or reception on one or multiple radio resources will be described in the present disclosure. For example, methods by which a UE receives the resource allocation for a radio resource set x including one or multiple radio resources from a BS and performs UL transmission or DL reception by reinterpreting the radio resource set x as a new radio resource set X will be described. When the UE performs UL transmission or DL reception by reinterpreting the resource allocation as the new radio resource set X, the UE may determine the position of an RS symbol to be used in the radio resource set X according to the example(s) of the present disclosure. According to the example(s) of the present disclosure, the UE may determine an effective RS symbol position for a plurality of radio resources (or a plurality of transmission occasions) even if the UE receives only one RS configuration and/or indication from the BS, and the BS may provide the RS configuration and/or indication to the UE.

Figure 16:
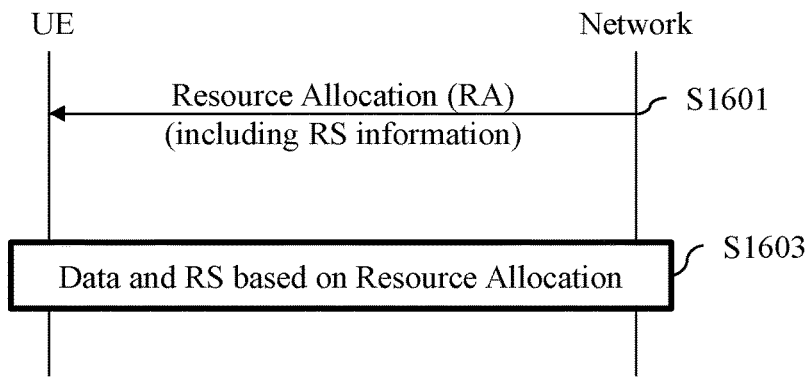
FIG. 16 illustrates a flow of data transmission/reception according to some implementations of the present disclosure.

FIG. 16 illustrates a flow of data transmission/reception according to some implementations of the present disclosure.

Referring to FIG. 16, a network (e.g., at least one BS) may transmit resource allocation information to a UE (S1601). The resource allocation information may be transferred to the UE through L1 signaling or higher layer signaling. The resource allocation information may include information on time-frequency regions(s) for one or multiple radio resources. The UE may receive a message including the resource allocation information from the network. For example, the UE may receive resource allocation information regarding a radio resource x including one or multiple radio resources from the BS. The UE may determine a radio resource X to be used for actual transmission based on the resource allocation information. In this case, the UE may not use a specific radio resource in consideration of slot boundaries, slot format information, etc. or change and use the time-frequency region of the radio resource. Here, one radio resource may be changed to a plurality of radio resources.

The UE may implicitly or explicitly receive information on the position of a symbol for a DMRS in addition to or as part of the resource allocation information (S1001). Hereinafter, an (OFDM) symbol in which a DMRS is located, that is, a symbol with a DMRS is referred to as a DMRS symbol. The information on the DMRS symbol position may be included in the message including the resource allocation information or transmitted through other L1 signaling or higher layer signaling. The UE may determine time-frequency resources for transmitting a PUSCH/PDSCH and the DMRS based on the information given to the UE. In this case, Method A or Method B described below may be used.

Method A. The DMRS symbol position is determined based on the resource allocation information. In this case, if no DMRS symbol position is included in a radio resource based on the resource allocation information, the UE and BS may determine the DMRS symbol position of the corresponding radio resource according to other methods.

Method B. The DMRS symbol position is determined based on the radio resource X to be used for actual transmission.

The UE and BS may perform PUSCH/PDSCH transmission/reception on the radio resource X to be used for actual transmission and may perform DMRS transmission/reception at the DMRS symbol position for the radio resource X (S1603).

Hereinafter, a radio resource configured/indicated by resource allocation information is referred to as a nominal resource, and a radio resource determined to be used for actual transmission/reception based on information given to the UE including the resource allocation information is referred to as an actual resource. The UE and BS may determine nominal time-frequency resource(s) or nominal transmission/reception occasion(s) based on a nominal resource allocation and determine an actual resource allocation based on the nominal time-frequency resource(s) (or nominal transmission/reception occasion(s)) and slot format information. For example, for PUSCH repetition type B, when a slot boundary and/or invalid symbol(s) are included in the nominal resource allocation, the UE determines the nominal resource allocation as one or more actual resource allocations based on the slot boundary and invalid symbol(s). For example, a symbol indicated as DL by higher layer configurations tdd-UL-DL-ConfigurationCommon and/or tdd-UL-DL-ConfigurationDedicated may be considered as an invalid symbol for PUSCH repetition type B transmission. The BS may provide to the UE an invalid symbol pattern for indicating whether a plurality of consecutive symbols are invalid at the symbol level through higher layer signaling. Invalid symbol(s) indicated by the invalid symbol pattern may be regarded to be invalid for the PUSCH repetition type B transmission. After determining invalid symbol(s) for each of the K nominal repetitions, the remaining symbols may be considered as potentially valid symbols. If the number of potentially valid symbols is greater than zero for a nominal repetition, the nominal repetition consists of one or more actual repetitions, where each actual repetition consists of a set of potentially valid consecutive symbols within a slot. When the symbols of a nominal repetition are separated by a slot boundary, the nominal repetition may be divided into two actual repetitions by the slot boundary. When an actual repetition includes a symbol indicated by SFI DCI in a direction opposite to the radio link direction of the actual repetition, the actual repetition may be omitted. For example, when an actual repetition for PUSCH type B transmission includes a symbol indicated as DL by SFI DCI, the actual repetition may be omitted.

When the UE is instructed, configured, or scheduled with repetition transmission, each radio resource (i.e., each transmission/reception occasion) according to a nominal resource allocation may be referred to as a nominal radio resource, a transmission/reception on each nominal radio resource may be referred to as a nominal transmission/reception or a nominal repetition, each radio resource according to an actual resource allocation may be referred to as an actual radio resource, and a transmission/reception on the actual radio resource may be referred to as an actual transmission/reception or an actual repetition.

In the example of FIG. 16, the UE may determine a radio resource to be used for actual transmission based on given resource allocation information and specify a DMRS symbol position for the radio resource to be used for actual transmission. In some implementations of the present disclosure, the configuration/indication of a DMRS symbol may be applied to resource allocation information or a plurality of radio resources so that DMRS symbol positions to be used for the plurality of radio resources may be indicated or configured with small signaling overhead, and ambiguity about the DMRS symbol positions may be removed when the UE uses the plurality of radio resources.

<Section A. DMRS Symbol Position for Repetitions>

Example 1

While a BS transmits resource allocation information to a UE and the UE analyzes the resource allocation information, the BS and UE may use the repetition transmission factor. For example, based on the repetition transmission factor, the BS and UE may perform multiple radio transmissions or receptions for one TB by repeating the resource allocation information for one transmission or reception at the slot or symbol level or in a back-to-back manner. Alternatively, the BS may explicitly transmit a plurality of resource allocations to the UE to perform the multiple radio transmissions or receptions. In this case, DMRS transmission/reception is essential to estimate a channel for each transmission or reception.

In some scenarios, to determine the position of symbol(s) for the DMRS transmission/reception, the BS may transmit information for determining the DMRS symbol position to the UE through L1 signaling and/or higher layer signaling together when indicating or configuring the resource allocation information. In some scenarios, the resource allocation information and/or the information on the DMRS symbol position may be given for one radio resource transmission, and the DMRS symbol position may be determined based on a slot structure. In scenarios in which the DMRS symbol position is determined based on the slot structure, additional consideration is needed to determine the DMRS symbol position for resources repeated at an interval different from the slot, for example, at the symbol level or in a back-to-back manner. In particular, different processing may be required for the following cases: when the DMRS symbol position is determined based on the starting point of a slot (e.g., mapping type A) and when the DMRS symbol position is determined based on the starting point of a radio resource (e.g., mapping type B).

To solve this problem, the BS may allocate a plurality of radio resources to the UE through information on one radio resource and the repetition transmission factor or through information on a plurality of radio resource allocations. In addition, the BS may indicate or configure to the UE parameters (e.g., DMRS mapping type, frequency hopping, additional DMRS position, DMRS port, and/or maxLength) available for determining the DMRS symbol position through L1 signaling and/or higher layer signaling. Here, the parameter maxLength is a parameter related to the maximum number of DMRS symbols for a PUSCH or PDSCH. The maximum number of front-loaded DMRS symbols for the PUSCH or PDSCH may be configured for the UE by the parameter maxLength. For example, if maxLength is not configured, a single-symbol DMRS may be scheduled for the UE by DCI or configured by a configured grant. The UE may be configured with an additional DMRS for the PUSCH by a parameter dmrs-AdditionalPosition, which contains information about the position of the additional DMRS. The value of dmrs-AdditionalPosition may be, for example, 'pos0', 'pos1', 'pos2', or 'pos3'. The UE may determine DMRS symbol position(s) from a DMRS position table based on the value of dmrs-AdditionalPosition. DMRS position tables are shown in the following. In particular, Table 14 shows PUSCH DMRS position(s) in a slot for a single-symbol DMRS and disabled intra-slot frequency hopping, Table 15 shows PUSCH DMRS position(s) in a slot for a double-symbol DMRS and disabled intra-slot frequency hopping, Table 16 shows PUSCH DMRS position(s) in a slot for a single-slot DMRS and enabled intra-slot hopping, Table 17 shows PDSCH DMRS position(s) for a single-symbol DMRS, and Table 18 shows PDSCH DMRS position(s) for a double-symbol DMRS.

The positions(s) of DMRS symbols for a PUSCH may be given by l' and a duration $l_d$ according to Table 14, 15, or 16. Here, for PUSCH mapping type A, $l_d$ denotes the duration between the first OFDM symbol of a corresponding slot and the last OFDM symbol of a scheduled PUSCH resource when intra-slot frequency hopping is disabled, or for PUSCH mapping type B, $l_d$ denotes the duration of a scheduled PUSCH resource when intra-slot frequency hopping is disabled. Alternatively, $l_d$ denotes the duration per hop when intra-slot frequency hopping is used.

TABLE 14

| | DM-RS positions l' | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

TABLE 15

| | DM-RS positions l' | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

TABLE 16

| | DM-RS positions l' | | | | | | | | | | |
|---|---|---|---|---|---|---|---|---|---|---|---|
| | PUSCH mapping type A | | | | | | | | PUSCH mapping type B | | |
| | $l_0 = 2$ dmrs-AdditionalPosition | | | | $l_0 = 3$ dmrs-AdditionalPosition | | | | $l_0 = 0$ dmrs-AdditionalPosition | | |
| | pos0 | | pos1 | | pos0 | | pos1 | | pos0 | | pos1 |
| $l_d$ in symbols | 1st hop | 2nd hop | 1st hop | 2nd hop | 1st hop | 2nd hop | 1st hop | 2nd hop | 1st hop | 2nd hop | 1st hop | 2nd hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

TABLE 17

| | DM-RS positions l' | | | | | | | |
|---|---|---|---|---|---|---|---|---|
| | PDSCH mapping type A dmrs-AdditionalPosition | | | | PDSCH mapping type B dmrs-AdditionalPosition | | | |
| $l_d$ in symbols | pos0 | pos1 | pos2 | pos3 | pos0 | pos1 | pos2 | pos3 |
| 2 | — | — | — | — | $l_0$ | $l_0$ | $l_0$ | $l_0$ |
| 3 | $l_0$ | $l_0$ | $l_0$ | $l_0$ | $l_0-$ | $l_0-$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0-$ | $l_0$, 4– | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0-$ | $l_0$, 6– | $l_0$, 3, 6 | $l_0$, 3, 6 |
| 9 | $l_0$ | $l_0$, 7 | $l_0$, 7 | $l_0$, 7 | $l_0-$ | $l_0$, 7– | $l_0$, 4, 7 | $l_0$, 4, 7 |
| 10 | $l_0$ | $l_0$, 9 | $l_0$, 6, 9 | $l_0$, 6, 9 | $l_0-$ | $l_0$, 7– | $l_0$, 4, 7 | $l_0$, 4, 7 |
| 11 | $l_0$ | $l_0$, 9 | $l_0$, 6, 9 | $l_0$, 6, 9 | $l_0-$ | $l_0$, 8– | $l_0$, 4, 8 | $l_0$, 3, 6, 9 |
| 12 | $l_0$ | $l_0$, 9 | $l_0$, 6, 9 | $l_0$, 5, 8, 11 | $l_0-$ | $l_0$, 9– | $l_0$, 5, 9 | $l_0$, 3, 6, 9 |
| 13 | $l_0$ | $l_0$, $l_1$ | $l_0$, 7, 11 | $l_0$, 5, 8, 11 | $l_0-$ | $l_0$, 9– | $l_0$, 5, 9 | $l_0$, 3, 6, 9 |
| 14 | $l_0$ | $l_0$, $l_1$ | $l_0$, 7, 11 | $l_0$, 5, 8, 11 | — | — | — | — |

TABLE 18

| | DM-RS positions l' | | | | | |
|---|---|---|---|---|---|---|
| | PDSCH mapping type A dmrs-AdditionalPosition | | | PDSCH mapping type B dmrs-AdditionalPosition | | |
| $l_d$ in symbols | pos0 | pos1 | pos2 | pos0 | pos1 | pos2 |
| <4 | — | — | | — | — | |
| 4 | $l_0$ | $l_0$ | | — | — | |
| 5 | $l_0$ | $l_0$ | | $l_0-$ | $l_0-$ | |
| 6 | $l_0$ | $l_0$ | | $l_0$ | $l_0$ | |
| 7 | $l_0$ | $l_0$ | | $l_0$ | $l_0$ | |
| 8 | $l_0$ | $l_0$ | | $l_0-$ | $l_0$, 5– | |

TABLE 18-continued

| | DM-RS positions l' | | | | | |
|---|---|---|---|---|---|---|
| | PDSCH mapping type A dmrs-AdditionalPosition | | | PDSCH mapping type B dmrs-AdditionalPosition | | |
| $l_d$ in symbols | pos0 | pos1 | pos2 | pos0 | pos1 | pos2 |
| 9  | $l_0$ | $l_0$      | | $l_0-$ | $l_0, 5-$ | |
| 10 | $l_0$ | $l_0, 8$   | | $l_0-$ | $l_0, 7-$ | |
| 11 | $l_0$ | $l_0, 8$   | | $l_0-$ | $l_0, 7-$ | |
| 12 | $l_0$ | $l_0, 8$   | | $l_0-$ | $l_0, 8-$ | |
| 13 | $l_0$ | $l_0, 10$  | | $l_0-$ | $l_0, 8-$ | |
| 14 | $l_0$ | $l_0, 10$  | | —     | —        | |

The position(s) of DMRS symbols for a PDSCH may be given by l' and a duration $l_d$ according to Table 17 or 18. Here, $l_d$ denotes the duration between the first OFDM symbol of a slot and the last OFDM symbol of a scheduled PDSCH resource in the slot in the case of PDSCH mapping type A, and $l_d$ denotes the duration of a scheduled PDSCH resource in the case of PDSCH mapping type B.

Hereinafter, parameter(s) that may be used to determine the DMRS symbol position are referred to as DMRS parameter(s). When the UE is indicated or configured with the DMRS parameter(s), the following method may be considered for transmission or reception on a plurality of radio resources.

Example 1-1

The UE and BS may determine one radio resource among a plurality of radio resources as a reference resource and determine a DMRS symbol position based on a DMRS parameter given for the reference resource. For other radio resource(s) except for the reference resources, the UE and BS may determine relative DMRS symbol positions with respect to the starting point of the reference resource. For example, when N DMRS symbol(s) determined for the reference resource are OFDM symbol(s) spaced apart from the starting point of the reference resource by $L_1, L_2, \ldots, L_N$, respectively, the OFDM symbol(s) spaced apart from the starting point of the reference resource by $L_1, L_2, \ldots, L_N$, respectively may be used as DMRS symbol(s) for the other radio resources.

Example 1-1 may be applied even when a radio resource has a different length from that of the reference resource. When the value of a DMRS symbol position with respect to the starting point of a radio resource, $L_m$ is greater than the length of the radio resource $L_d$, the DMRS symbol position may be ignored. In some implementations of the present specification, the reference resource may be a radio resource that starts first in the time domain among a plurality of radio resources. Alternatively, the reference resource may be a resource having the largest size (e.g., the largest number of resource elements or the largest number of OFDM symbols) among a plurality of radio resources.

Example 1-2

The UE and BS use a given DMRS parameter in each radio resource to determine a DMRS symbol position. In this case, when the given DMRS parameter is applied to a prescribed radio resource, the radio resource may be determined to be an unexpected or invalid radio resource. For example, there may be restrictions on the length or start symbol of a radio resource in applying the given DMRS parameter. In preparation for this case, in some implementations of the present disclosure, the UE may arbitrarily change and use the given DMRS parameter in some radio resources. For example, the following method(s) may be applied.

Option 1-1: When the UE is allocated a plurality of radio resources for a plurality of PUSCH transmissions through one piece of control information (e.g., one control information signaling or one control information message) and applies a given DMRS parameter value X to a specific radio resource among the plurality of radio resources, the radio resource may be considered to be an unexpected or invalid radio resource. In this case, the UE may use another DMRS parameter value Y. The other DMRS parameter value Y may be predefined or determined by L1 signaling and/or higher layer signaling from the BS. The other DMRS parameter value Y may be the same as or different from the DMRS parameter value X. For example, when mapping type A is applied, if the corresponding radio resource is considered to be an unexpected or invalid radio resource, the UE and BS may use mapping type B. When mapping type B is applied, if the corresponding radio resource is considered as an unexpected or invalid radio resource, the UE and BS may use mapping type A. According to Option 1-1, when a specific DMRS parameter value is invalid for a prescribed radio resource, the UE may arbitrarily change the specific DMRS parameter value to another predetermined DMRS parameter value, thereby reducing cases where scheduling becomes impossible and increasing the scheduling flexibility of the BS. In some implementations of the present disclosure, the specific radio resource may be radio resources except for a radio used for initial transmission among a plurality of given radio resources.

Option 1-2: Regardless of the DMRS parameter given to the UE, when a DMRS parameter value X is valid for a radio resource to be applied (e.g., when the DMRS parameter value X is validly applied to the radio resource), the DMRS parameter value X is preferentially used. Otherwise, another DMRS parameter value Y may be used. The DMRS parameter values X and Y may be predefined or determined by L1 signaling and/or higher layer signaling from the BS. The other DMRS parameter value Y may be the same as or different from the DMRS parameter value X. When the UE is allocated a plurality of radio resources for a plurality of PUSCH transmissions through one piece of control information (e.g., one control information signaling or one control information message), Option 1-2 may be applied to a specific radio resource among the plurality of radio resources.

For example, when mapping type A is valid for a resource to be applied, mapping type A is preferentially used regardless of the given DMRS parameter value. Otherwise, the given DMRS parameter or mapping type B may be used as needed.

Alternatively, when mapping type B is valid for the resource to be applied, mapping type B is preferentially used. Otherwise, the given DMRS parameter or mapping type A may be used as needed. For example, since PUSCH mapping type B is applicable to radio resources given by resource allocations with a start symbol of S∈{0, . . . ,13} and a resource length of L∈{1, . . . ,14}, it may be regarded that PUSCH mapping type B is always valid for scenarios in which resource allocation information with the start symbol of S∈{0, . . . ,13} and the resource length of L∈{1, . . . ,14} is provided. In other words, for PUSCH repetitions based on the resource allocation with the start symbol of S∈{0, . . .

,13} and the resource length of L∈{1, . . . ,14}, the UE and BS may apply PUSCH mapping type B to all radio resources for the PUSCH repetitions.

Alternatively, when it is determined that a prescribed DMRS parameter (e.g., mapping type B) is always valid for UL transmission regardless of given radio resources, the corresponding DMRS parameter may always be used regardless of the given DMRS parameter. For example, since the first symbol of a PUSCH resource is used as the DMRS symbol in PUSCH mapping type B, PUSCH mapping type B may be considered to be always valid regardless of the given radio resources. Therefore, regardless of the mapping type given for UL transmission, for example, although mapping type A is given for UL transmission, mapping type A may be applied to all transmission occasions for PUSCH repetitions.

In some implementations of the present disclosure, the specific radio resource may be radio resources except for a radio resource used for initial transmission among a plurality of given radio resources.

Figure 7:
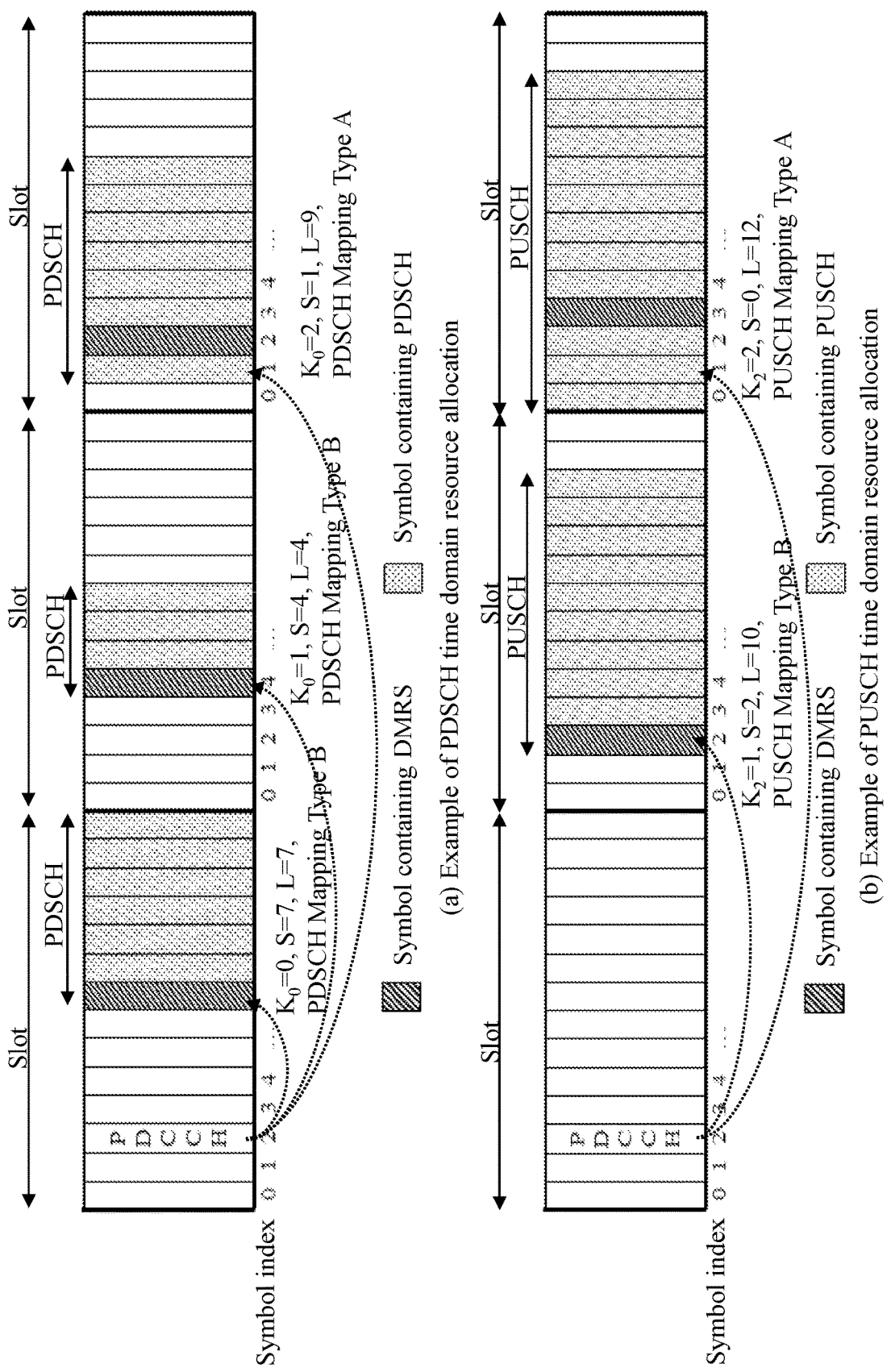
FIG. 7 is a diagram illustrating an example of physical downlink shared channel (PDSCH) time-domain resource allocation based on a PDCCH and an example of physical uplink shared channel (PUSCH) time-domain resource allocated based on a PDCCH.

As described in FIG. 7, the reference point for the DMRS symbol position 1 for a PUSCH radio resource, i.e., a PUSCH transmission occasion and the position $l_0$ of the first DMRS symbol depend on mapping types. For PUSCH mapping type A, when frequency hopping is disabled, 1 is defined relative to the start of a slot. When frequency hopping is enabled, l is defined relative to the start of each hop. $l_0$ is given by a higher layer parameter dmrs-TypeA-Position. Here, the parameter dmrs-TypeA-Position is a parameter related to a (first) DMRS for DL and UL, which is provided by the BS to the UE through an MIB carried by a PBCH or higher layer signaling for a serving cell. For PUSCH mapping type B, when frequency hopping is disabled, l is defined relative to the start of scheduled PUSCH resources. When frequency hopping is enabled, l is defined relative to the start of each hop. In addition, $l_0$ is defined as follows: $l_0=0$. In some implementations of Option 1-3, for example, the UE and BS may always determine the value of the parameter dmrs-TypeA-Position as a specific value (e.g., 0).

The BS may provide the value of the parameter dmrs-AddilionalPosition to the UE through higher layer signaling (e.g., RRC signaling). In some implementations of the present disclosure, for example, the UE and BS may always determine the value of the parameter dmrs-AdditionalPosition as a specific value (e.g., pos0). According to Option 1-2, the UE and BS may be allowed to mainly use an applicable specific DMRS mapping type, thereby reducing cases where scheduling is impossible and increasing the scheduling flexibility of the BS. In addition, unnecessary DMRS overhead may be reduced.

Figure 17:
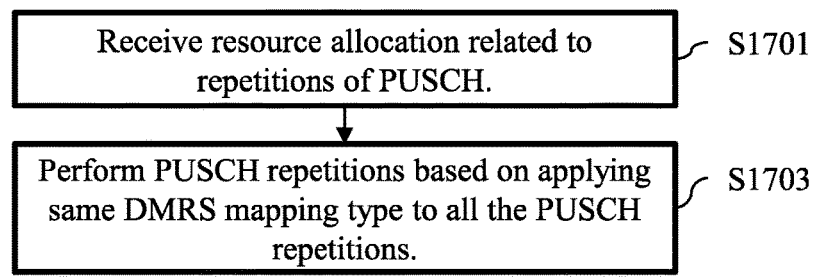
FIG. 17 illustrates a flow of PUSCH repetitions according to an example of the present disclosure.

FIG. 17 illustrates a flow of PUSCH repetitions according to an example of the present disclosure. A UE may receive a resource allocation for the PUSCH repetitions (S1701). The UE may perform the PUSCH repetitions by applying the same DMRS mapping type to all of the PUSCH repetitions regardless of a DMRS mapping type given for the PUSCH repetitions based on the resource allocation (S1703).

Figure 18:
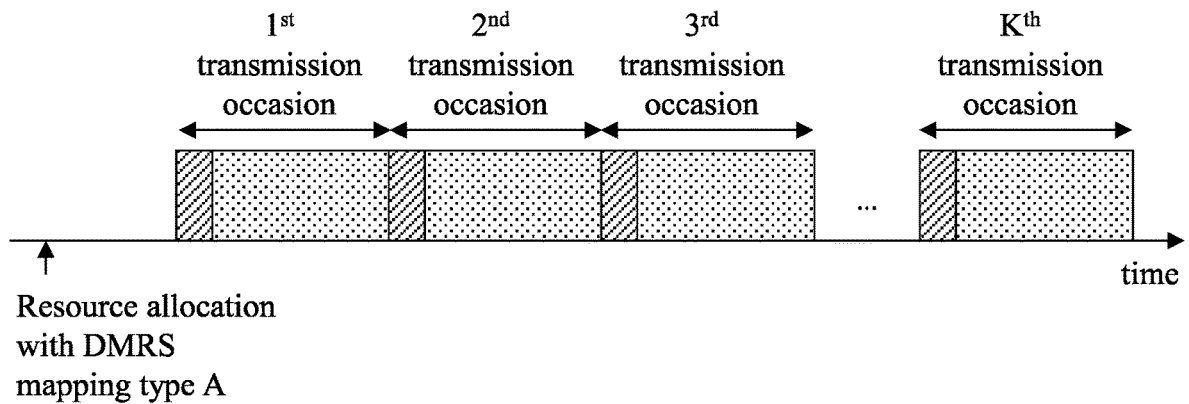
FIG. 18 illustrates a demodulation reference signal (DMRS) symbol position for PUSCH repetitions according to an example of the present disclosure.

FIG. 18 illustrates a DMRS symbol position for PUSCH repetitions according to an example of the present disclosure.

Referring to FIG. 18, although a UE receives a resource allocation with DMRS mapping type A from a BS, the UE may transmit a DMRS in the first symbol of each PUSCH resource for repetitions by applying DMRS mapping type B. The BS may receive PUSCH repetitions in the expectation that the UE may perform the PUSCH repetitions by applying DMRS mapping type B even if the BS provides the resource allocation with DMRS mapping type A to the UE.

Option 1-3: When the UE is allocated radio resources for a plurality of PUSCH transmissions through one piece of control information (e.g., one control information signaling or one control information message), the UE may expect that the BS will always indicate or configure a specific DMRS parameter value. Alternatively, the UE may expect that the BS will not indicate or configure a specific DMRS parameter value. In this case, the UE may expect that an indicated or configured DMRS parameter value is always applicable to or valid for each allocated radio resource.

For example, the UE may expect that DMRS mapping type B will be always used for a plurality of PUSCH transmissions scheduled by one DCI.

For example, the UE and BS may always assume that the value of the parameter dmrs-TypeA-Position is a specific value (e.g., 0). In other words, only the first symbol of a corresponding actual resource allocation may be always used regardless of DMRS mapping types.

For example, the UE and BS may assume that the value of the parameter dmrs-AdditionalPosition is always equal to a specific value (e.g., pos0). In other words, a corresponding radio resource may always have only one DMRS position.

Option 1-3 may fundamentally guarantee always applicable radio resource allocations, thereby decreasing the operation complexity of the UE and reducing the implementation difficulty of the UE. In addition, unnecessary DMRS overhead may be reduced.

Example 1-3

In using Example 1, the UE and BS may determine whether to use Example 1 or each sub-example based on whether the UE is configured or indicated with repetition transmission or based on the value of the repetition transmission factor. For example, the BS may configure or instruct the UE to use a specific type of repetition transmission (e.g., symbol-level, back-to-back, etc.) or configure or indicate the repetition factor used to indicate the number of repetitions of such repetition transmission. When the value of the repetition factor is greater than 1, the UE and BS may use Example 1 or each sub-example.

Example 1-4

In using Example 1, the value of the parameter dmrs-TypeA-Position may always be assumed to be a specific value (e.g., 0 or pos2) to reduce DMRS overhead or achieve a faster decoding time. In this case, the actual value configured for the parameter dmrs-TypeA-Position may be ignored. Alternatively, an additional value may be configured for dmrs-TypeA-Position. For example, a value of pos0=0 may be additionally set as one configurable value for dmrs-TypeA-Position. In other words, the UE and BS may always use only the first symbol of a corresponding radio resource regardless of DMRS mapping types.

Example 1-5

In using Example 1, the value of dmrs-AdditionalPosition may be assumed to be always equal to a specific value (e.g., pos0) to reduce DMRS overhead. In this case, the actual value configured for the parameter dmrs-AdditionalPosition may be ignored. In other words, when one DCI indicates a plurality of radio resources, only one DMRS position may always be used with no additional DMRS positions.

In some implementations of the present disclosure, one radio resource or one transmission/reception occasion in Section A may be one radio resource or one transmission/reception occasion based on a nominal resource allocation. Alternatively, in some implementations of the present disclosure, one radio resource or one transmission/reception occasion in Section A may be one radio resource or one transmission/reception occasion of an actual resource allocation.

The example(s) in Section A may be applied together with the example(s) in Section B or the example(s) in Section B. In some implementations of the present disclosure, the example(s) in Section B or the example(s) in Section C may be applied for each repetition. In some implementations of the present disclosure, each radio resource or each transmission/reception occasion in Section A may be one radio resource or one transmission/reception occasion configured/indicated/scheduled by a nominal resource allocation in Section B or Section B. Alternatively, in some implementations of the present disclosure, each radio resource or each transmission/reception occasion in Section A may be one radio resource or one transmission/reception occasion based on an actual resource allocation in Section B or Section B.

<Section B. DMRS Symbol Position Based on Nominal Transmission/Reception>

Example 2

A BS may transmit a nominal resource allocation to a UE, and the UE may divide one time-frequency resource given by the corresponding resource allocation into a plurality of time-frequency resources or combine a plurality of given time-frequency resources into one time-frequency resource to obtain an actual resource allocation used for actual transmission or reception. In this case, the UE and BS may use a DMRS symbol position determined based on the nominal resource allocation to determine a DMRS symbol position used for transmission or reception based on the actual resource allocation. According to Example 2, since similar symbol position(s) and a similar number of symbols may be used even if one transmission is divided into a plurality of transmissions, the DMRS symbol overhead of radio resources by the actual resource allocation may become similar to the DMRS symbol overhead of radio resources by the nominal resource allocation.

More specifically, the following examples may be considered.

Example 2-1

When one nominal resource allocation is divided into a plurality of actual resource allocations or when a plurality of nominal resource allocations are combined into one actual resource allocation, the UE may determine the absolute position of a DMRS symbol by applying a given DMRS parameter to the nominal resource allocation and then use the determined absolute DMRS symbol position as the DMRS symbol position of the actual resource allocation.

Figure 19:
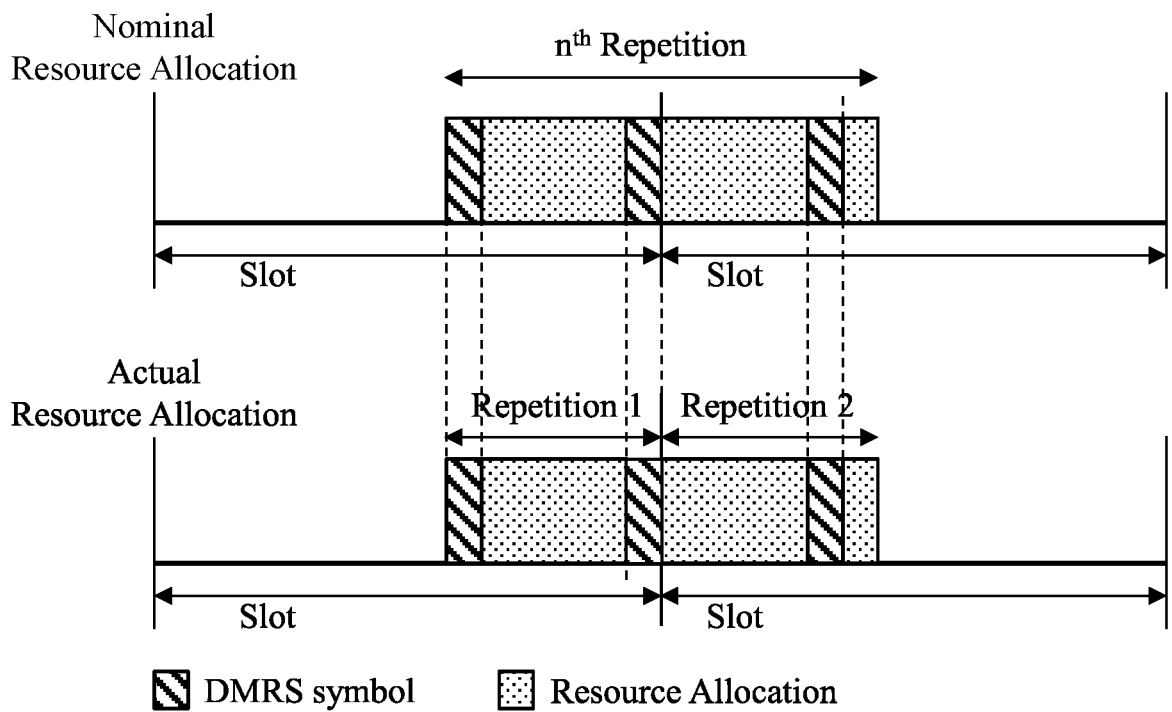
FIG. 19 is a diagram for explaining Example 2-1 of the present disclosure.

FIG. 19 is a diagram for explaining Example 2-1 of the present disclosure.

Referring to FIG. 19, when one nominal resource allocation with DMRS mapping type B, dmrs-AdditionalPosition=2, and symbol length=12 crosses a slot boundary, the UE may perform UL transmission or DL reception by dividing the corresponding nominal resource allocation into two actual resource allocations. In this case, if intra-slot frequency hopping is disabled, the duration of a PUSCH resource $l_d$ is 12 in the case of PUSCH mapping type B so that DMRS symbol positions of $l_0$, 5, and 10, which correspond to $l_d$=12 and dmrs-AdditionalPosilion=pos2 in Table 14, (that is, 0th, 5th and 10th symbols among the symbols of the PUSCH resource) may be determined as DMRS symbol positions for the nominal resource allocation.

Example 2-2

When Example 2 is used, the following cases may occur: a divided/combined actual resource allocation includes no DMRS symbols and on the contrary, the divided/combined actual resource allocation includes only DMRS symbols. In this case, the UE and/or BS may perform the following operations.

Option 2-1: The UE and BS may perform no transmission or reception for an actual resource allocation that includes no DMRS symbols or includes only DMRS symbols. Option 2-1 simplifies the operations of the UE and allows the BS to use the corresponding radio resources for other purposes.

Option 2-2: When one nominal resource allocation is divided into multiple actual resource allocations or multiple nominal resource allocations are combined into one actual resource allocation, the UE and BS may always assume that a front-loaded DMRS is included in each actual resource allocation regardless of DMRS parameter values. In other words, it is assumed that a DMRS is transmitted or received at the starting point of each actual resource allocation.

In this case, the length of the front-loaded DMRS may be determined based on the time length L of each actual resource allocation. If the time length L of the actual resource allocation is greater than or equal to a prescribed value X, a double-symbol DMRS may be used. Otherwise, a single-symbol DMRS may be used.

Alternatively, the length of the front-loaded DMRS may be determined based on a DMRS antenna port and a configuration number (e.g., maxLength).

Figure 20:
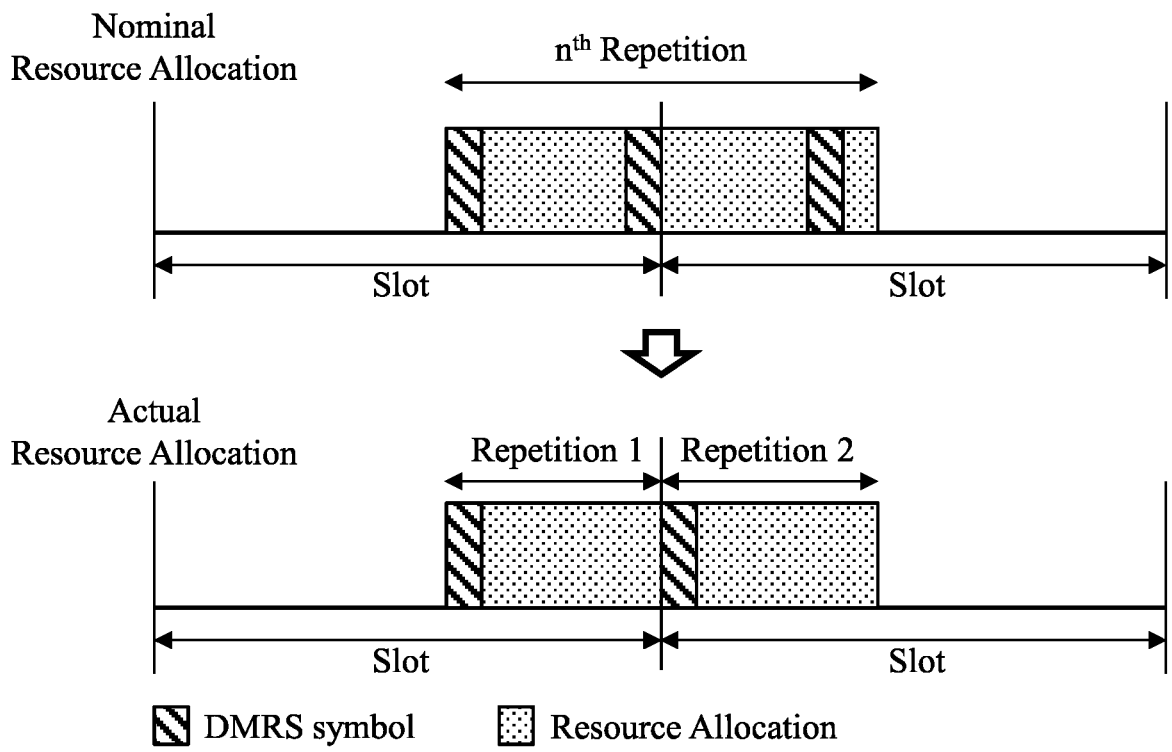
FIG. 20 is a diagram for explaining Example 2-2 of the present disclosure.

FIG. 20 is a diagram for explaining Example 2-2 of the present disclosure.

In FIG. 20, when one nominal resource allocation having a length of 12 symbols and crossing a slot boundary is divided into two actual resource allocations, the position of a DMRS symbol used in each actual resource allocation may be always assumed to be the first OFDM symbol of each actual resource allocation, regardless of DMRS symbol positions determined by the nominal resource allocation.

According to Option 2-2, since a DMRS symbol is always included in an actual resource allocation, stable channel estimation performance may be expected.

Option 2-3: When a specific actual resource allocation includes no DMRS or there is no DMRS at a predefined/promised/indicated symbol position, the UE and BS may always assume that a front-loaded DMRS is included in the corresponding actual resource allocation regardless of DMRS parameter values. In other words, it is assumed that a DMRS is transmitted or received at the starting point of the corresponding actual resource allocation.

In this case, the length of the front-loaded DMRS may be determined based on the time length L of each actual resource allocation. If the time length L of the actual resource allocation is greater than or equal to a prescribed value X, a double-symbol DMRS may be used. Otherwise, a single-symbol DMRS may be used.

Figure 21:
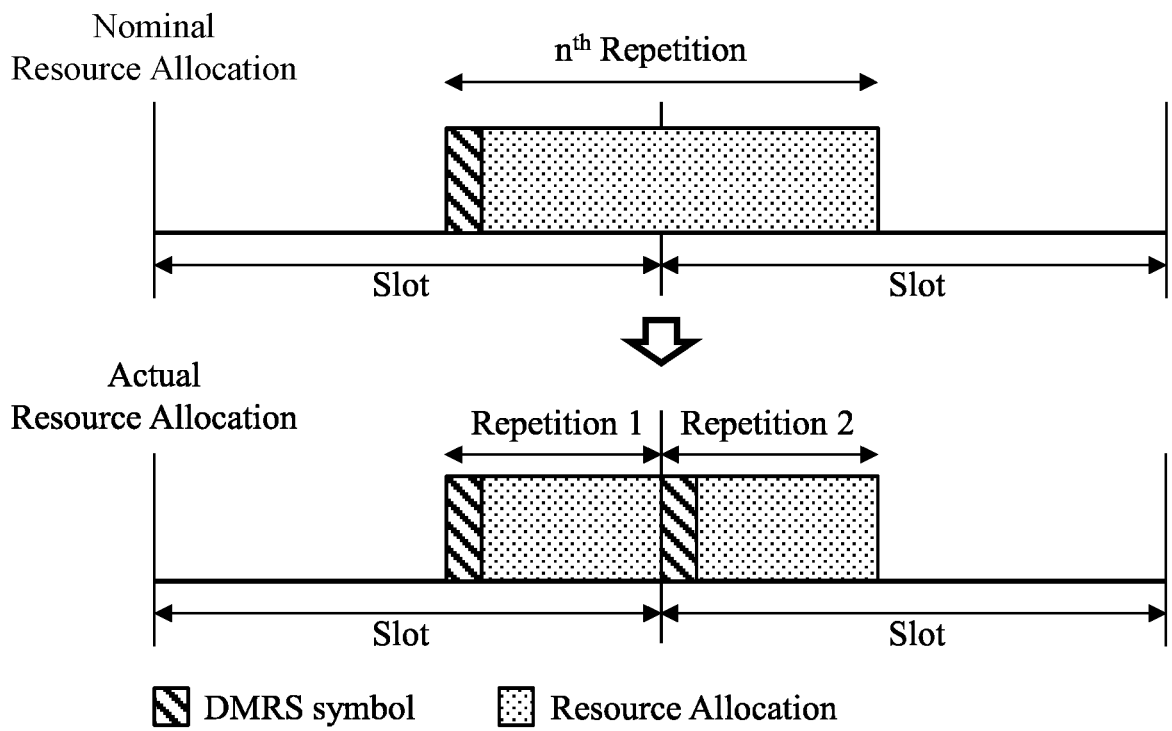
FIG. 21 is a diagram for explaining Example 2-3 of the present disclosure.

FIG. 21 is a diagram for explaining Example 2-3 of the present disclosure.

In FIG. 21, when one nominal resource allocation having a length of 12 symbols and crossing a slot boundary is divided into two actual resource allocations, the 0th symbol, which is the DMRS symbol position determined by the nominal resource allocation, is used as it is in a first actual resource allocation. In a second actual resource allocation consisting of symbols including no DMRS symbols in the nominal resource allocation, the first OFDM symbol of the second actual resource allocation may be assumed as the DMRS symbol.

Option 2-3 may not only have the advantages of Example 2-1 in that DMRS symbol positions determined by a nominal resource allocation are maximally used, but also allow the UE to use more resources by always including DMRS symbols in an actual resource allocation.

Option 2-4: When any actual resource allocation includes no DMRS or there is no DMRS at a predefined/promised/indicated symbol position, the UE and BS may apply a given DMRS parameter to the corresponding actual resource allocation and determine a DMRS symbol position to be used in the corresponding actual resource allocation.

In this case, to obtain similar effects to Option 2-3, the value of the parameter dmrs-TypeA-Position may always be assumed to be a specific value (e.g., 0). In other words, the first symbol of the corresponding actual resource allocation may always be used as a DMRS symbol, regardless of DMRS mapping types.

To obtain similar effects to Option 2-3, the value of the parameter dmrs-AdditionalPosition may be assumed to be always equal to a specific value (e.g., pos0). In other words, the corresponding actual resource allocation may always have only one DMRS position.

Option 2-3) may not only have the advantages of Example 2-1 in that DMRS symbol positions determined by a nominal resource allocation are maximally used, but also prevent possible omission of DMRS symbols by allowing DMRS transmission in an actual resource allocation including no DMRS symbols to be performed in the same way as in the prior art.

Example 2-3

When Example 2 is used, the UE may use a separate table to determine a DMRS symbol position. In other words, a DMRS position table used when one nominal resource allocation is used as one actual resource allocation may be different from a DMRS position table used when one nominal resource allocation is divided into a plurality of actual resource allocations or when a plurality of nominal resource allocations are combined into one actual resource allocation.

The DMRS position table may refer to a table that may be used to determine a DMRS symbol position with a given DMRS parameter such as, for example, Table 14, Table 15, Table 16, Table 17, or Table 18.

Example 2-3 may be useful in using Example 2-1 and Example 2-2 in that each actual resource allocation is allowed to include a DMRS symbol and nevertheless DMRS overhead is maintained at a proper level.

<Section C. RS Symbol Position Based on Actual Transmission/Reception>

Example 3

A BS may transmit a nominal resource allocation to a UE, and the UE may divide one time-frequency resource given by the nominal resource allocation into a plurality of time-frequency resources or combine a plurality of given time-frequency resources into one time-frequency resource to obtain an actual resource allocation used for actual transmission or reception. In this case, to determine a DMRS symbol position used for transmission or reception based on the actual resource allocation, the UE and BS may use a DMRS symbol position determined in consideration of only the actual resource allocation regardless of the nominal resource allocation. In other words, a DMRS symbol position in each actual resource allocation may be determined based on time-frequency resources of the corresponding actual resource allocation. According to Example 3, even if one transmission is divided into a plurality of transmissions, each of the plurality of transmissions may be performed in the same way as transmission based on a nominal resource allocation, thereby preventing possible omission of DMRS symbols.

In this case, the following examples may be considered.

Example 3-1

When one nominal resource allocation is divided into a plurality of actual resource allocations or a plurality of nominal resource allocations are combined into one actual resource allocation, the UE may determine a DMRS symbol position by applying a given DMRS parameter to each actual resource allocation.

Figure 22:
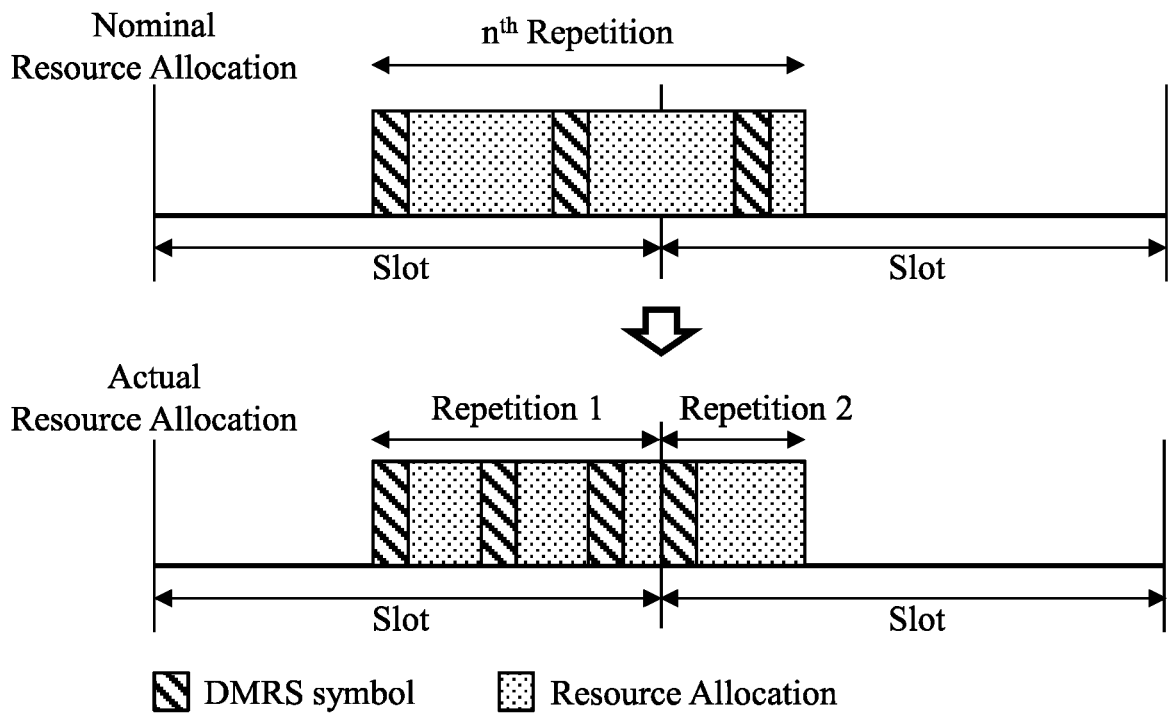
FIG. 22 is a diagram for explaining Example 3-1 of the present disclosure.

FIG. 22 is a diagram for explaining Example 3-1 of the present disclosure.

When one nominal resource allocation with DMRS mapping type B, dmrs-AdditionalPosition=2, and symbol length=12 crosses a slot boundary, the UE may divide the nominal resource allocation into an actual resource allocation with 8 symbols and an actual resource allocation with 4 symbols as illustrated in FIG. 22 in order to use the corresponding nominal resource allocation and then perform UL transmission or DL reception. In this case, the positions of DMRS symbols used in the actual resource allocations may be separately determined by applying a given DMRS parameter. For example, since DMRS symbol positions corresponding to $l_d=8$ and dmrs-AdditionalPosilion=pos2 for DMRS mapping type B are $l_0$, 3, and 6 in Table 14, the 0th, 3rd, and 6th symbols with respect to the start of the resource are used for DMRS transmission in the actual resource allocation with 8 symbols. Since DMRS symbol positions corresponding to $l_d=4$ and dmrs-AdditionalPosition=pos2 for DMRS mapping type B are $l_0$ in Table 14, the 0th symbol with respect to the start of the resource is used for DMRS transmission in the actual resource allocation with 4 symbols.

Example 3-2

When one nominal resource allocation is divided into a plurality of actual resource allocations or a plurality of nominal resource allocations are combined into one actual resource allocation, the UE may apply Example 1-1. In other words, each actual resource allocation may be assumed as radio resources according to Example 1-1 and one actual resource allocation may be assumed as a reference resource allocation so that a DMRS symbol position for the reference resource allocation may be determined. In other actual resource allocations, the DMRS symbol position determined based on the reference resource allocation may be used. More specifically, the following methods may be used.

The UE and BS may determine one of a plurality of actual resource allocations as the reference resource allocation, determine a DMRS symbol position based on a DMRS parameter given for the reference resource allocation, and then use relative DMRS positions with respect to the starting point of the reference resource allocation in other actual resource allocation(s) except for the reference resource allocation. For example, when N DMRS symbol(s) determined for the reference resource allocation are OFDM symbol(s) spaced from the starting point of the reference resource allocation by $L_1, L_2, \ldots, L_N$, respectively, the UE and BS may use the OFDM symbol(s) spaced apart by $L_1, L_2, \ldots, L_N$ from the starting point of the corresponding radio resource as DMRS symbol(s) for other actual resource allocations.

In some implementations of the present disclosure, Example 3-2 may be applied even when the time length of a prescribed radio resource is different from the time length of the reference resource allocation. When a DMRS symbol position $L_n$, is greater than the length $L_d$ of an actual resource allocation, the corresponding DMRS symbol position may be ignored. In some implementations of the present disclosure, the reference resource allocation may be an actual resource allocation that starts first in the time domain among a plurality of actual resource allocations. Alternatively, the reference resource allocation may be an actual resource allocation having the largest resource allocation size (e.g., the largest number of resource elements and the largest number of OFDM symbols) among a plurality of actual resource allocations.

Example 3-3

In using Example 3, the value of dmrs-TypeA-Position may always be assumed to be a specific value (e.g., 0 or pos2) to reduce DMRS overhead. In this case, the actual value configured for the parameter dmrs-TypeA-Position may be ignored. In other words, the UE and BS may always use only the first symbol of a corresponding actual resource allocation as a DMRS symbol regardless of DMRS mapping types.

Example 3-4

In using Example 3, the value of dmrs-AdditionalPosition may be assumed to be always equal to a specific value (e.g., pos0) to reduce DMRS overhead. In this case, the actual value configured for the parameter dmrs-AdditionalPosilion may be ignored. In other words, according to Example 3-4, an actual resource allocation may always have only one DMRS position with no additional DMRS positions.

Example 3-5

When Example 3 is used, if a given DMRS parameter is applied to a prescribed actual resource allocation, the corresponding radio resource may be considered as an unexpected or invalid radio resource. For example, there may be restrictions on the length or start symbol of a radio resource in applying the given DMRS parameter. In preparation for this case, in some implementations of the present disclosure, the UE may arbitrarily change and use the given DMRS parameter in the corresponding actual resource allocation. For example, the following method(s) may be applied.

Option 3-1: When the UE is allocated a DMRS parameter X and a plurality of radio resources for a plurality of PUSCH transmissions through one piece of control information (e.g., one control information signaling or one control information message), the UE may use another DMRS parameter value Y rather than the DMRS parameter X for a specific radio resource among the plurality of radio resources. The other DMRS parameter value Y may be predefined or determined by L1 signaling and/or higher layer signaling from the BS. The other DMRS parameter value Y may be the same as or different from the DMRS parameter value X.

For example, when mapping type A is applied, if the corresponding radio resource is considered as an unexpected or invalid radio resource, mapping type B is used. When mapping type B is applied, if the corresponding radio resource is considered as an unexpected or invalid radio resource, mapping type A may be used.

In some implementations of the present disclosure, the specific radio resource may be one of a plurality of actual resource allocations obtained by dividing one nominal resource allocation or one actual resource allocation obtained by combining a plurality of nominal resource allocations.

Option 3-1 allows the UE to arbitrarily change to another predetermined DMRS parameter value when it is difficult for the UE to use a specific DMRS parameter value, thereby reducing cases where scheduling is impossible and increasing the scheduling flexibility of the BS.

Option 3-2: Regardless of the given DMRS parameter, if a prescribed DMRS parameter value X is valid for a radio resource to be applied, the DMRS parameter value X may be preferentially used. Otherwise, another DMRS parameter value Y may be used. The DMRS parameter values X and Y may be predefined or determined by L1 signaling and/or higher layer signaling from the BS. The other DMRS parameter value Y may be the same as or different from the DMRS parameter value X.

For example, when mapping type A is valid for a resource to be applied, mapping type A may be preferentially used regardless of the given DMRS parameter value. Otherwise, mapping type B may be used.

Alternatively, when mapping type B is valid for the resource to be applied, mapping type B is preferentially used. Otherwise, mapping type A may be used. For example, since PUSCH mapping type B is applicable to radio resources given by resource allocations with a start symbol of $S \in \{0, \ldots, 13\}$ and a resource length of $L \in \{1, \ldots, 14\}$, it may be regarded that PUSCH mapping type B is always valid for scenarios in which resource allocation information with the start symbol of $S \in \{0, \ldots, 13\}$ and the resource length of $L \in \{1, \ldots, 14\}$ is provided. In other words, for PUSCH repetitions based on the resource allocation with the start symbol of $S \in \{0, \ldots, 13\}$ and the resource length of $L \in \{1, \ldots, 14\}$, the UE and BS may apply PUSCH mapping type B to all radio resources for the PUSCH repetitions.

Alternatively, when mapping type B is always valid for UL transmission regardless of the given radio resource, mapping type B may always be used. For example, DMRS mapping type B may always be used for UL transmission using a plurality of PUSCHs scheduled by one DCI are used (i.e., for PUSCH repetitions scheduled by DCI).

Option 3-2 allows the UE and/or BS to mainly use a specific applicable DMRS mapping type, thereby reducing cases where scheduling is impossible and increasing the scheduling flexibility of the BS.

Option 3-3: When one nominal resource allocation is divided into a plurality of actual resource allocations or a plurality of nominal resource allocations are combined into one actual resource allocation, the UE may expect that the BS will always indicate or configure a specific DMRS parameter value. Alternatively, the UE may expect that the BS will not indicate or configure a specific DMRS parameter value. In this case, the UE may expect that an indicated or configured DMRS parameter value is always applicable to each allocated radio resource. For example, the UE may expect that DMRS mapping type B will be always used for UL transmission using a plurality of PUSCHs scheduled by one DCI (i.e., for PUSCH repetitions scheduled by DCI).

Option 3-3 may fundamentally guarantee always applicable radio resource allocations, thereby decreasing the operation complexity of the UE and reducing the implementation difficulty of the UE.

Example 3-6

When Example 3 is used, the UE may use a separate table to determine a DMRS symbol position. In other words, a DMRS position table used when one nominal resource allocation is used as one actual resource allocation may be different from a DMRS position table used when one nominal resource allocation is divided into a plurality of actual resource allocations or when a plurality of nominal resource allocations are combined into one actual resource allocation.

The DMRS position table may refer to a table that may be used to determine a DMRS symbol position with a given DMRS parameter such as, for example, Table 14, Table 15, Table 16, Table 17, or Table 18.

Example 3-6 may be useful in using Example 3-1 in that overall DMRS overhead is maintained at an appropriate level.

The examples of the present disclosure may be applied independently, or two or more of the examples may be applied together.

For PUSCH transmission or PDSCH reception, a UE may perform operations according to some implementations of the present disclosure. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable storage medium may store at least one computer program including instructions that, when executed by at least one processor, cause the at least one processor to perform the operations according to some implementations of the present disclosure. For example, the operations according to some implementations of the present disclosure may include: receiving a resource allocation for the PUSCH; determining a plurality of radio resources based on the resource allocation; and repeatedly transmitting the PUSCH based on the plurality of radio resources. Repeatedly transmitting the PUSCH may include: applying PUSCH mapping type B to each of the plurality of radio resources; and transmitting a DMRS for the PUSCH based on the plurality of radio resources and the PUSCH mapping type B.

For PUSCH reception or PDSCH transmission, a BS may perform operations according to some implementations of the present disclosure. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable storage medium may store at least one computer program including instructions that, when executed by at least one processor, cause the at least one processor to perform the operations according to some implementations of the present disclosure. For example, the operations according to some implementations of the present disclosure may include: transmitting a resource allocation for the PUSCH to a UE; determining a plurality of radio resources based on the resource allocation; and repeatedly receiving the PUSCH based on the plurality of radio resources. Repeatedly receiving the PUSCH may include: applying PUSCH mapping type B to each of the plurality of radio resources; and receiving a DMRS for the PUSCH based on the plurality of radio resources and the PUSCH mapping type B.

Determining the plurality of radio resources may include: determining a plurality of nominal resources based on a repetition factor configured for the UE and the resource allocation; and determining a plurality of actual resources based on the plurality of nominal resources. Each of the plurality of radio resources may be an actual resource. That is, each of the plurality of radio resources may be an actually repeated time-frequency resource. The plurality of nominal resources may be consecutive in a time domain. For example, the UE may determine the plurality of nominal resources located back-to-back in the time domain based on the resource allocation. Each of the plurality of actual resources may be a set of consecutive (valid) symbols in a slot. The DMRS may be mapped from a first symbol of each of the plurality of radio resources based on the PUSCH mapping type B. Applying the PUSCH mapping type B to each of the plurality of radio resources may include: applying the PUSCH mapping type B with the resource allocation regardless of a PUSCH mapping type provided to the UE.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:
1. A method of transmitting a physical uplink shared channel (PUSCH) by a user equipment (UE) in a wireless communication system, the method comprising:
 receiving a demodulation reference signal (DMRS) configuration including DMRS parameters related to a DMRS symbol position for PUSCH transmissions;
 receiving a resource allocation for the PUSCH;
 determining a plurality of nominal resources, which are consecutive in a time domain, based on the resource allocation;

determining a plurality of a plurality of actual resources based on the plurality of nominal resources, wherein each actual resource is a set of consecutive symbols in a slot and each nominal resource includes one or more actual resources; and repeatedly transmitting the PUSCH and a DMRS for the PUSCH based on the plurality of actual resources, wherein repeatedly transmitting the PUSCH and the DMRS for the PUSCH based on the plurality of actual resources comprises:

mapping the PUSCH and the DMRS for the PUSCH within each of the plurality of actual resources i) based on the DMRS parameters and ii) according to PUSCH mapping type B where a symbol for the DMRS for the PUSCH is defined relative to a start of a radio resource to which the PUSCH is mapped, wherein each symbol for the DMRS is determined by applying the DMRS parameters to each of the plurality of actual resources based on a duration of a corresponding actual resource.

2. The method of claim 1, wherein each nominal resource, which is across a slot boundary, among the plurality of nominal resources is divided at the slot boundary into two actual resources.

3. The method of claim 1, wherein the DMRS is mapped to at least a first symbol of each of the plurality of actual resources based on the PUSCH mapping type B.

4. The method of claim 1, wherein the PUSCH mapping type B is applied to each of the plurality of actual resources regardless of a PUSCH mapping type provided for the resource allocation.

5. A user equipment (UE) configured to transmit a physical uplink shared channel (PUSCH) in a wireless communication system, the UE comprising:
at least one transceiver;
at least one processor; and
at least one computer memory operably connected to the at least one processor and configured to store instructions that, when executed, cause the at least one processor to perform operations comprising:
receiving a demodulation reference signal (DMRS) configuration including DMRS parameters related to a DMRS symbol position for PUSCH transmissions;
receiving a resource allocation for the PUSCH;
determining a plurality of nominal resources, which are consecutive in a time domain, based on the resource allocation;
determining a plurality of a plurality of actual resources based on the plurality of nominal resources, wherein each actual resource is a set of consecutive symbols in a slot and each nominal resource includes one or more actual resources; and
repeatedly transmitting the PUSCH and a DMRS for the PUSCH based on the plurality of actual resources,
wherein repeatedly transmitting the PUSCH and the DMRS for the PUSCH based on the plurality of actual resources comprises:
mapping the PUSCH and the DMRS for the PUSCH within each of the plurality of actual resources i) based on the DMRS parameters and ii) according to PUSCH mapping type B where a symbol for the DMRS for the PUSCH is defined relative to a start of a radio resource to which the PUSCH is mapped,
wherein each symbol for the DMRS is determined by applying the DMRS parameters to each of the plurality of actual resources based on a duration of a corresponding actual resource.

6. A base station (BS) for receiving a physical uplink shared channel (PUSCH) in a wireless communication system, the BS comprising:
at least one transceiver;
at least one processor; and
at least one computer memory operably connected to the at least one processor and configured to store instructions that, when executed, cause the at least one processor to perform operations comprising:
transmitting a demodulation reference signal, DMRS, configuration including DMRS parameters related to a DMRS symbol position for PUSCH transmissions;
transmitting a resource allocation for the PUSCH to a user equipment (UE);
determining a plurality of nominal resources, which are consecutive in a time domain, based on the resource allocation;
determining a plurality of a plurality of actual resources based on the plurality of nominal resources, wherein each actual resource is a set of consecutive symbols in a slot and each nominal resource includes one or more actual resources; and
repeatedly receiving the PUSCH and a DMRS for the PUSCH based on the plurality of actual resources,
wherein repeatedly receiving the PUSCH and the DMRS for the PUSCH based on the plurality of actual resources comprises:
receiving the PUSCH and the DMRS for the PUSCH within each of the plurality of actual resources i) based on the DMRS parameters and ii) according to PUSCH mapping type B where a symbol for the DMRS for the PUSCH is defined relative to a start of a radio resource to which the PUSCH is mapped,
wherein each symbol for the DMRS is determined by applying the DMRS parameters to each of the plurality of actual resources based on a duration of a corresponding actual resource.

7. The BS of claim 6, wherein each nominal resource, which is across a slot boundary, among the plurality of nominal resources is divided at the slot boundary into two actual resources.

8. The BS of claim 6, wherein the DMRS is mapped to at least a first symbol of each of the plurality of actual resources based on the PUSCH mapping type B.

9. The BS of claim 6, wherein the PUSCH mapping type B is applied to each of the plurality of actual resources regardless of a PUSCH mapping type provided for the resource allocation.

* * * * *

UNITED STATES PATENT AND TRADEMARK OFFICE
CERTIFICATE OF CORRECTION

PATENT NO. : 12,108,387 B2
APPLICATION NO. : 17/594442
DATED : October 1, 2024
INVENTOR(S) : Duckhyun Bae et al.

Page 1 of 1

It is certified that error appears in the above-identified patent and that said Letters Patent is hereby corrected as shown below:

In the Claims

In Column 55, Line 1:
Delete "determining a plurality of a plurality of actual resources" and insert --determining a plurality of actual resources--

In Column 55, Line 48:
Delete "determining a plurality of a plurality of actual resources" and insert --determining a plurality of actual resources--

In Column 56, Line 27:
Delete "determining a plurality of a plurality of actual resources" and insert --determining a plurality of actual resources--

Signed and Sealed this
Twenty-fourth Day of June, 2025

Coke Morgan Stewart
*Acting Director of the United States Patent and Trademark Office*